United States Patent
Lozano

(10) Patent No.: US 9,094,424 B2
(45) Date of Patent: Jul. 28, 2015

(54) METHOD, APPARATUS, AND COMPUTER PROGRAM PRODUCT FOR DIGITAL STREAM SWAPPING BETWEEN SIGNAL SOURCES

(75) Inventor: Raul Lozano, Espoo (FI)

(73) Assignee: Nokia Technologies Oy, Espoo (FI)

( * ) Notice: Subject to any disclaimer, the term of this patent is extended or adjusted under 35 U.S.C. 154(b) by 375 days.

(21) Appl. No.: 13/352,639

(22) Filed: Jan. 18, 2012

(65) Prior Publication Data

US 2013/0182798 A1 Jul. 18, 2013

(51) Int. Cl.
 *H04L 27/06* (2006.01)
 *H04L 29/06* (2006.01)
 *H04W 4/00* (2009.01)
 *H04W 4/18* (2009.01)
 *H04B 7/04* (2006.01)
 *H04W 84/18* (2009.01)

(52) U.S. Cl.
 CPC ........ *H04L 65/1089* (2013.01); *H04L 65/4084* (2013.01); *H04W 4/008* (2013.01); *H04W 4/18* (2013.01); *H04B 7/0413* (2013.01); *H04W 84/18* (2013.01)

(58) Field of Classification Search
 CPC ....................................................... H04B 7/0413
 USPC ................................................. 375/260, 267
 See application file for complete search history.

(56) References Cited

U.S. PATENT DOCUMENTS

| | | | |
|---|---|---|---|
| 2004/0111526 A1* | 6/2004 | Baldwin et al. ............... | 709/231 |
| 2008/0214196 A1* | 9/2008 | Sambhwani et al. ......... | 455/446 |
| 2009/0080378 A1* | 3/2009 | Gupta et al. .................. | 370/329 |

OTHER PUBLICATIONS

Proceedings of the Linux Symposium, vol. 1, Jul. 23-26, 2008, Ottawa, Ontario, Canada, pp. 1-71.
M. Holtmann, Audio Streaming Over Bluetooth, 2008 Linux Symposium, vol. One, pp. 193-196.

* cited by examiner

*Primary Examiner* — Shuwang Liu
*Assistant Examiner* — Ross Varndell
(74) *Attorney, Agent, or Firm* — Locke Lord LLP

(57) ABSTRACT

Method, apparatus, and computer program product example embodiments for digital stream swapping between digital signal sources. A new event handler functionality enables swapping an existing digital stream to a next one if more than one digital stream is identified, enabling a user to easily and intuitively switch between the existing streams.

20 Claims, 17 Drawing Sheets

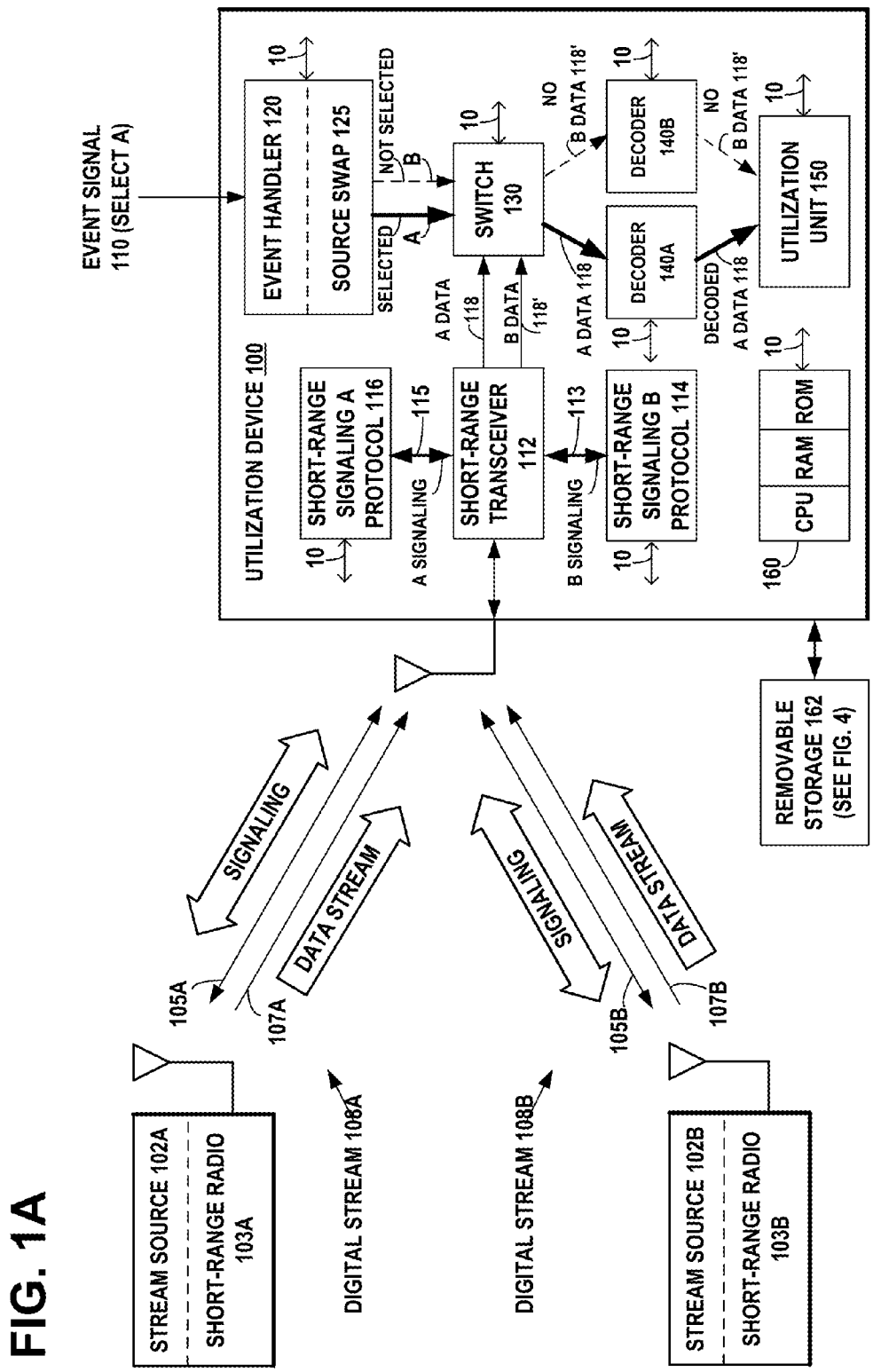

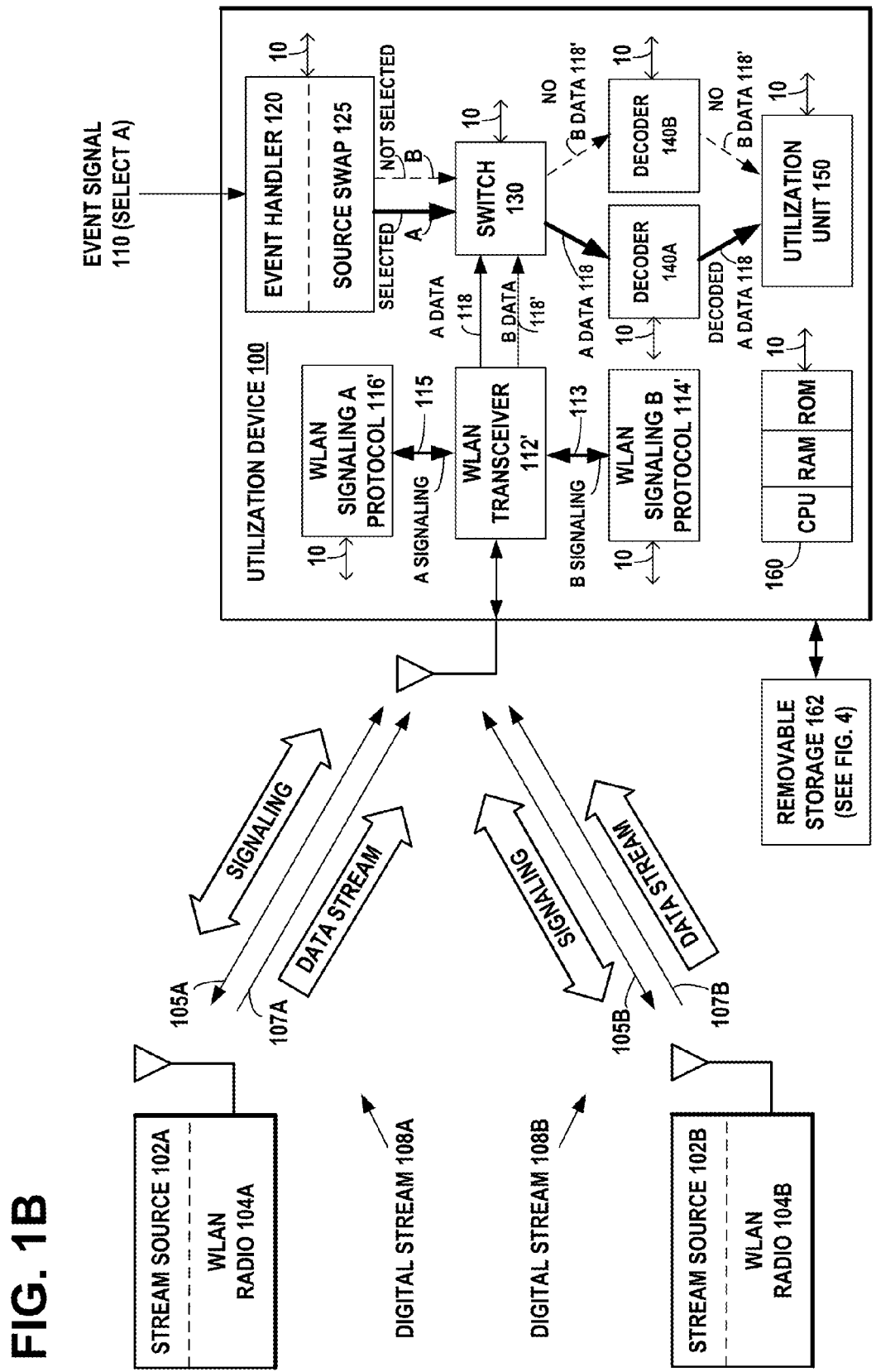

FIG. 3B

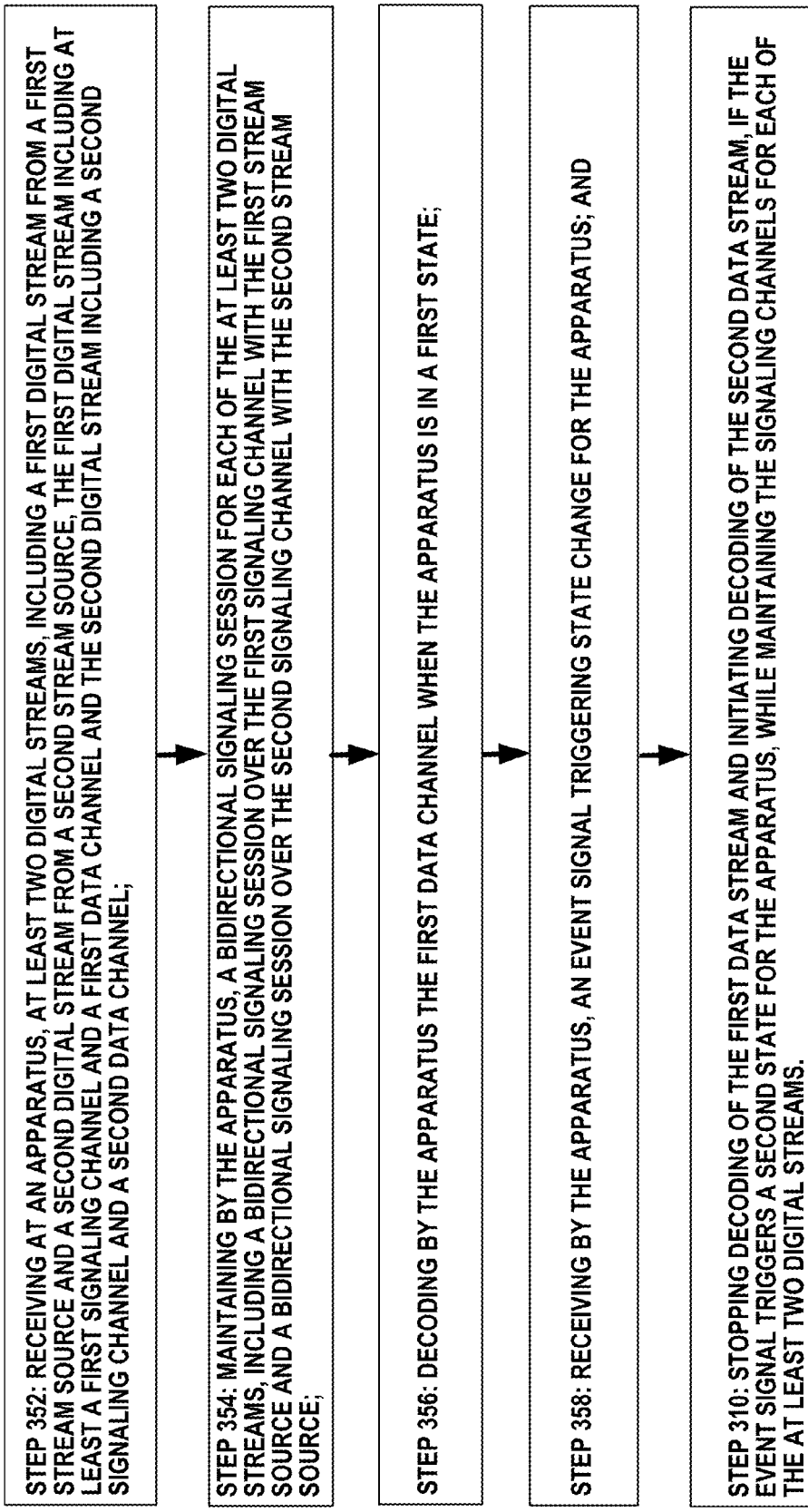

STEP 352: RECEIVING AT AN APPARATUS, AT LEAST TWO DIGITAL STREAMS, INCLUDING A FIRST DIGITAL STREAM FROM A FIRST STREAM SOURCE AND A SECOND DIGITAL STREAM FROM A SECOND STREAM SOURCE, THE FIRST DIGITAL STREAM INCLUDING AT LEAST A FIRST SIGNALING CHANNEL AND A FIRST DATA CHANNEL AND THE SECOND DIGITAL STREAM INCLUDING A SECOND SIGNALING CHANNEL AND A SECOND DATA CHANNEL;

STEP 354: MAINTAINING BY THE APPARATUS, A BIDIRECTIONAL SIGNALING SESSION FOR EACH OF THE AT LEAST TWO DIGITAL STREAMS, INCLUDING A BIDIRECTIONAL SIGNALING SESSION OVER THE FIRST SIGNALING CHANNEL WITH THE FIRST STREAM SOURCE AND A BIDIRECTIONAL SIGNALING SESSION OVER THE SECOND SIGNALING CHANNEL WITH THE SECOND STREAM SOURCE;

STEP 356: DECODING BY THE APPARATUS THE FIRST DATA CHANNEL WHEN THE APPARATUS IS IN A FIRST STATE;

STEP 358: RECEIVING BY THE APPARATUS, AN EVENT SIGNAL TRIGGERING STATE CHANGE FOR THE APPARATUS; AND

STEP 310: STOPPING DECODING OF THE FIRST DATA STREAM AND INITIATING DECODING OF THE SECOND DATA STREAM, IF THE EVENT SIGNAL TRIGGERS A SECOND STATE FOR THE APPARATUS, WHILE MAINTAINING THE SIGNALING CHANNELS FOR EACH OF THE AT LEAST TWO DIGITAL STREAMS.

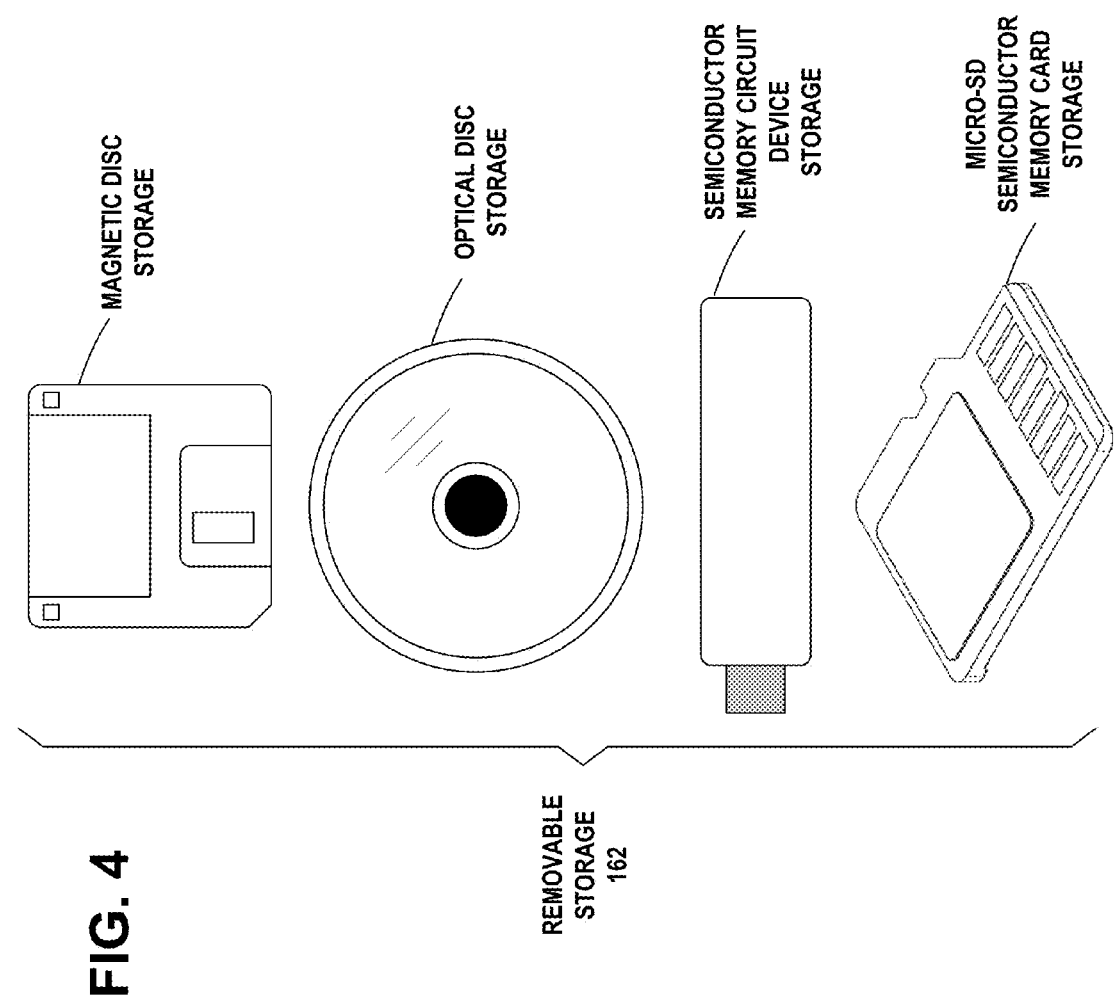

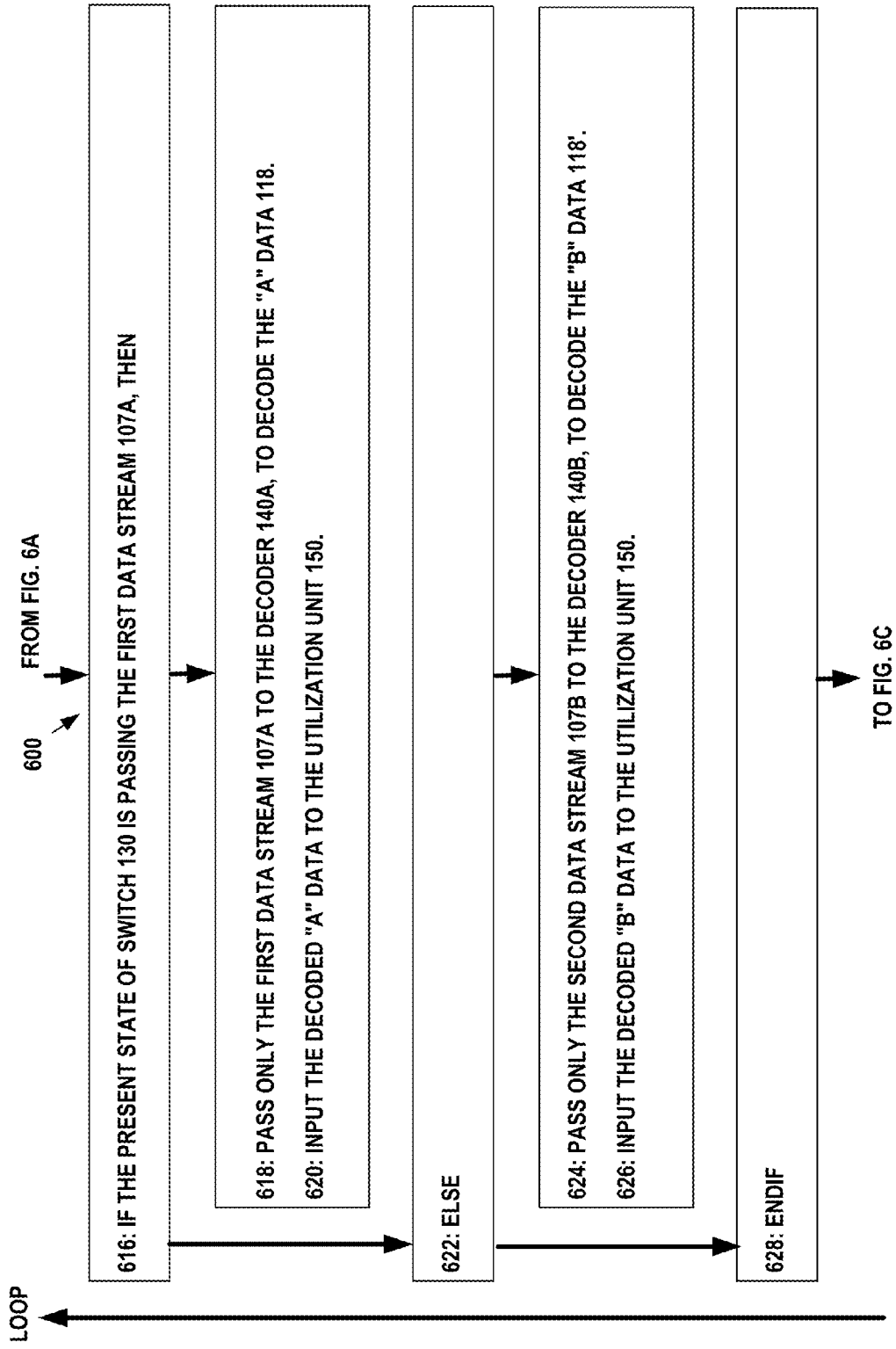

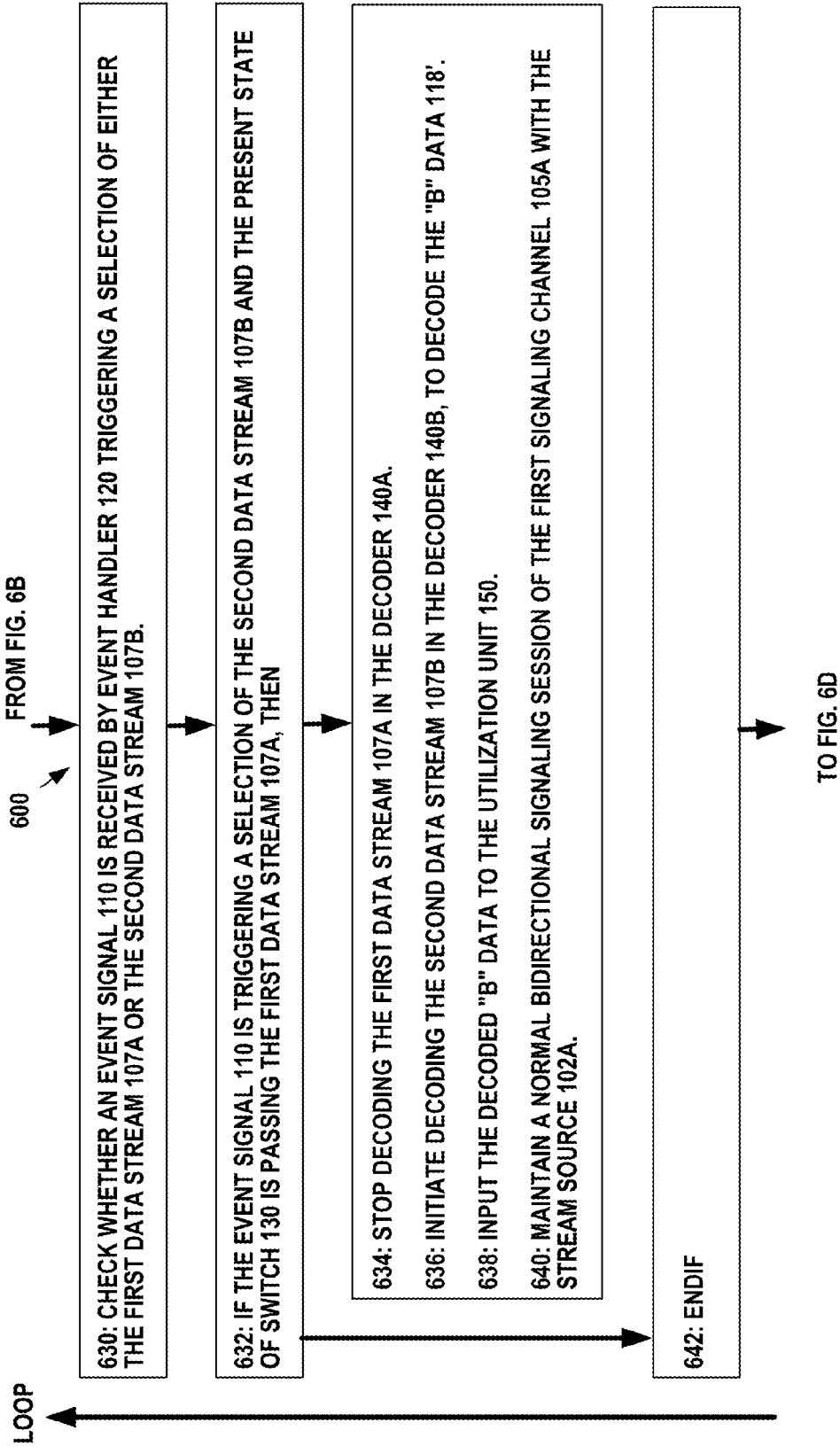

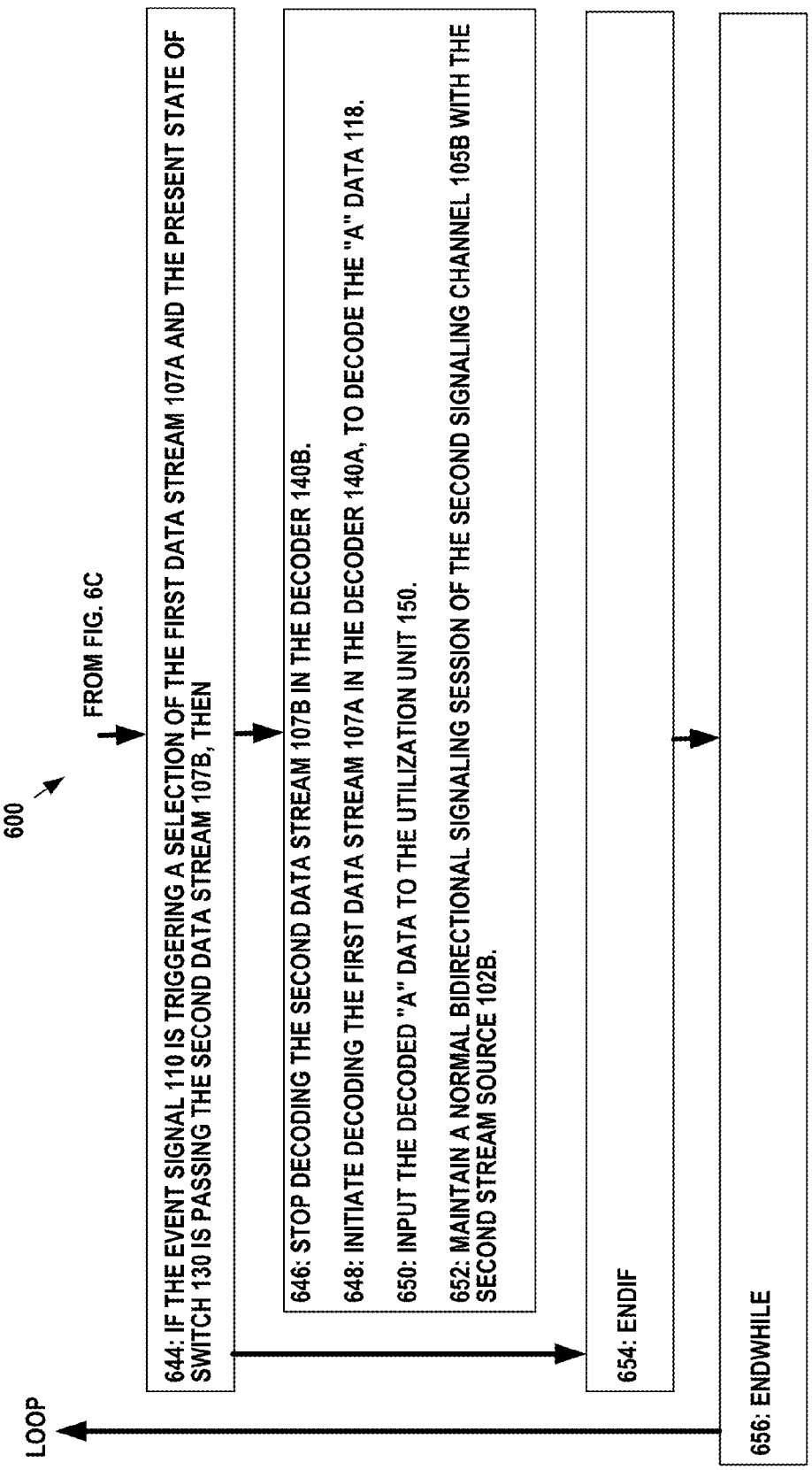

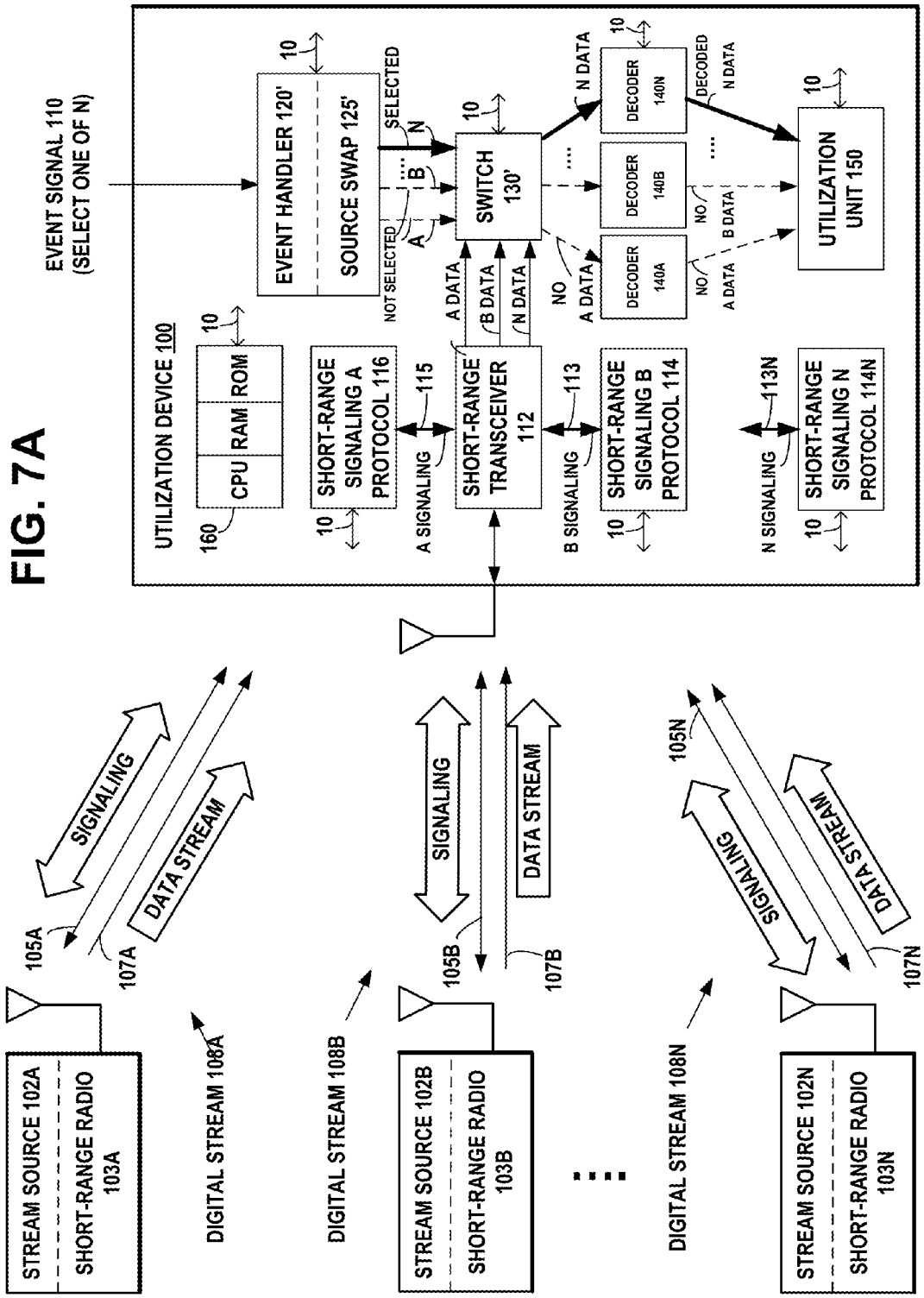

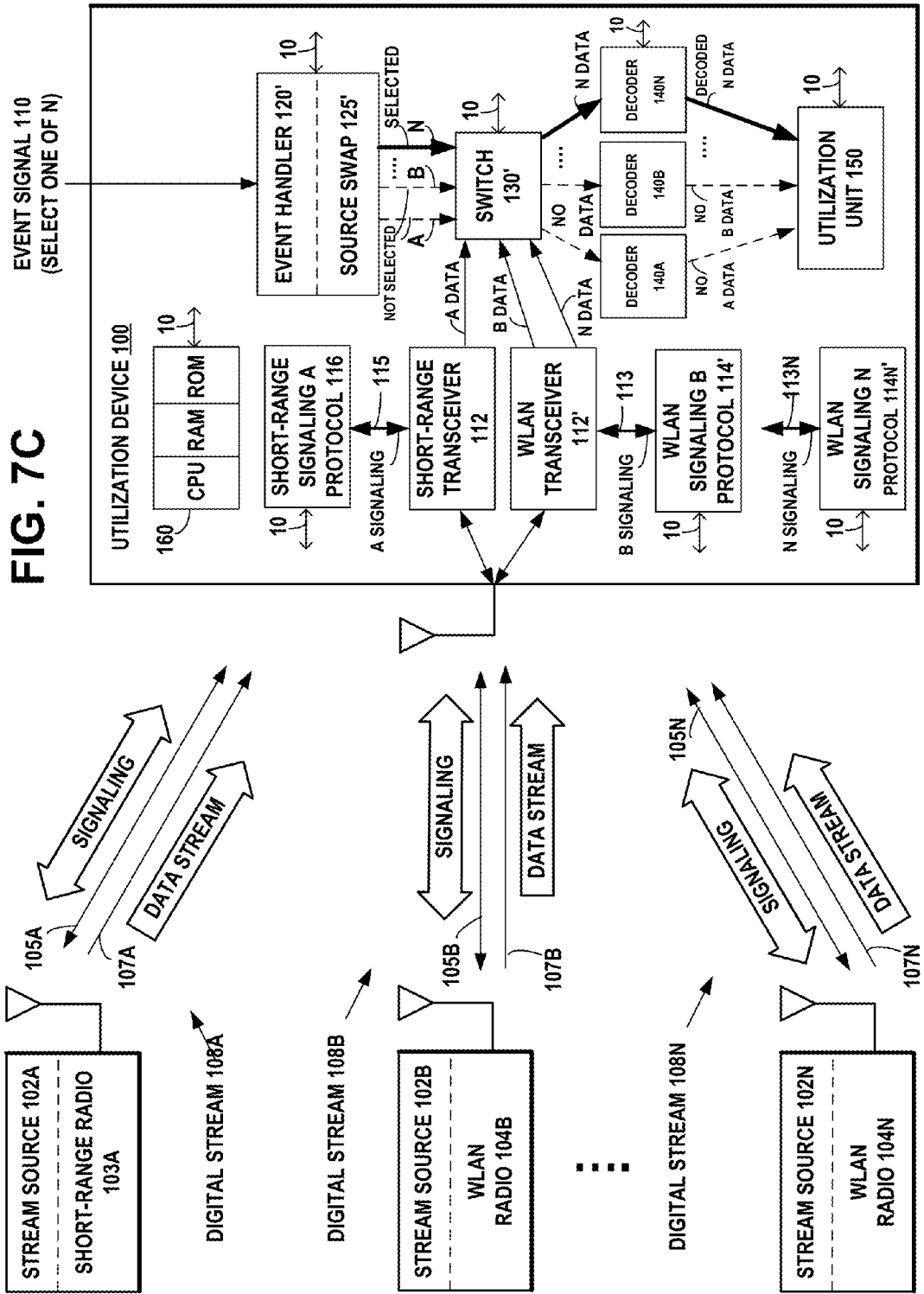

METHOD, APPARATUS, AND COMPUTER PROGRAM PRODUCT FOR DIGITAL STREAM SWAPPING BETWEEN SIGNAL SOURCES

FIELD

The field of the invention relates to wireless short-range communication and more particularly to digital stream swapping between digital signal sources.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features that make them appropriate for various applications.

SUMMARY

Method, apparatus, and computer program product example embodiments are disclosed for digital stream swapping between digital signal sources.

An example embodiment of the invention includes a method comprising:
receiving an initial active stream at an apparatus, the initial active stream including at least a first signaling channel and a first data channel that is decoded and applied to a utilization device;
receiving an alternate stream at the apparatus, the alternate stream including a second signaling channel and a second data channel;
receiving an event signal triggering a stream swap; and
stopping decoding of the first data channel of the initial active stream and initiating decoding the second data channel of the alternate stream for applying it to the utilization device while maintaining the signaling channels for both the initial active stream and the alternate stream in response to the received event signal.

An example embodiment of the invention includes the method further comprising:
wherein the event is at least one of a button press, a voice command, or a gesture.

An example embodiment of the invention includes the method further comprising:
wherein the utilization device is at least one of an audio playing device, a video playing device, or an audio/video playing device.

An example embodiment of the invention includes the method further comprising:
receiving a second event signal triggering a second stream swap;
stopping the decoding of the data channel but maintaining the signaling channel of the alternate stream in response to the second event signal; and
resuming decoding the data channel of the active stream and applying it to the utilization device.

An example embodiment of the invention includes the method further comprising:
wherein the active stream and the alternate stream are as last one of a Bluetooth digital stream or a wireless LAN digital stream.

An example embodiment of the invention includes an apparatus comprising:
at least one processor;
at least one memory including computer program code;
the at least one memory and the computer program code configured to, with the at least one processor, cause the apparatus at least to:
receive an initial active stream, the initial active stream including at least a first signaling channel and a first data channel that is decoded and applied to a utilization device;
receive an alternate stream, the alternate stream including a second signaling channel and a second data channel;
receive an event signal triggering a stream swap; and
stop decoding of the first data channel of the initial active stream and initiating decoding the second data channel of the alternate stream for applying it to the utilization device while maintaining the signaling channels for both the initial active stream and the alternate stream in response to the received event signal.

An example embodiment of the invention includes the apparatus further comprising:
wherein the event is at least one of a button press, a voice command, or a gesture.

An example embodiment of the invention includes the apparatus further comprising:
wherein the utilization device is at least one of an audio playing device, a video playing device, or an audio/video playing device.

An example embodiment of the invention includes the apparatus further comprising:
the at least one memory and the computer program code configured to, with the at least one processor, cause the apparatus at least to:
receive a second event signal triggering a second stream swap;
stop the decoding of the data channel but maintaining the signaling channel of the alternate stream in response to the second event signal; and
resume decoding the data channel of the active stream and applying it to the utilization device.

An example embodiment of the invention includes the apparatus further comprising:

wherein the active stream and the alternate stream are as last one of a Bluetooth digital stream or a wireless LAN digital stream.

An example embodiment of the invention includes a computer program product comprising computer executable program code recorded on a computer readable non-transitory storage medium, the computer executable program code, when executed by a computer processor, causing performance of the steps of:

receiving an initial active stream at an apparatus, the initial active stream including at least a first signaling channel and a first data channel that is decoded and applied to a utilization device;

receiving an alternate stream at the apparatus, the alternate stream including a second signaling channel and a second data channel;

receiving an event signal triggering a stream swap; and stopping decoding of the first data channel of the initial active stream and initiating decoding the second data channel of the alternate stream for applying it to the utilization device while maintaining the signaling channels for both the initial active stream and the alternate stream in response to the received event signal.

An example embodiment of the invention includes the computer program product further comprising: wherein the event is at least one of a button press, a voice command, or a gesture.

An example embodiment of the invention includes the computer program product further comprising: wherein the utilization device is at least one of an audio playing device, a video playing device, or an audio/video playing device.

An example embodiment of the invention includes the computer program product further comprising: the computer executable program code, when executed by a computer processor, further causing performance of the steps of:

receiving a second event signal triggering a second stream swap;

stopping the decoding of the data channel but maintaining the signaling channel of the alternate stream in response to the second event signal; and resuming decoding the data channel of the active stream and applying it to the utilization device.

An example embodiment of the invention includes the computer program product further comprising: wherein the active stream and the alternate stream are as last one of a Bluetooth digital stream or a wireless LAN digital stream.

An example embodiment of the invention includes a method comprising:

receiving at an apparatus, at least two digital streams, including a first digital stream from a first stream source and a second digital stream from a second stream source, the first digital stream including at least a first signaling channel and a first data channel and the second digital stream including a second signaling channel and a second data channel;

maintaining by the apparatus, a bidirectional signaling session for each of the at least two digital streams, including a bidirectional signaling session over the first signaling channel with the first stream source and a bidirectional signaling session over the second signaling channel with the second stream source;

decoding by the apparatus the first data channel when the apparatus is in a first state;

receiving by the apparatus, an event signal triggering state change for the apparatus; and stopping decoding of the first data stream and initiating decoding of the second data stream, if the event signal triggers a second state for the apparatus, while maintaining the signaling channels for each of the at least two digital streams.

An example embodiment of the invention includes the method further comprising:

receiving at the apparatus, a third digital stream of the at least two digital streams, from a third stream source, the third digital stream including at least a third signaling channel and a third data channel, maintaining by the apparatus, a bidirectional signaling session over the third signaling channel with the third stream source;

receiving by the apparatus, an event signal triggering a selection of the third data stream; and stopping decoding the first data stream and initiating decoding the third data stream, when the event signal triggers a selection of the third data stream and the apparatus is in the first state, or alternately stopping decoding the second data stream and initiating decoding the third data stream, when the event signal triggers a selection of the third data stream and the apparatus is in the second state, while maintaining the signaling channels for each of the at least two digital streams in response to the received event signal.

An example embodiment of the invention includes the method further comprising:

applying the decoded first data channel to a utilization device when the apparatus is in the first state or applying the decoded second data channel to the utilization device when the apparatus is in the second state.

An example embodiment of the invention includes an apparatus comprising:

at least one processor;

at least one memory including computer program code;

the at least one memory and the computer program code configured to, with the at least one processor, cause the apparatus at least to:

receive at least two digital streams, including a first digital stream from a first stream source and a second digital stream from a second stream source, the first digital stream including at least a first signaling channel and a first data channel and the second digital stream including a second signaling channel and a second data channel;

maintain a bidirectional signaling session for each of the at least two digital streams, including a bidirectional signaling session over the first signaling channel with the first stream source and a bidirectional signaling session over the second signaling channel with the second stream source;

decode the first data channel when the apparatus is in a first state;

receive an event signal triggering state change for the apparatus; and stop decoding of the first data stream and initiate decoding of the second data stream, if the event signal triggers a second state for the apparatus, while maintaining the signaling channels for each of the at least two digital streams.

An example embodiment of the invention includes a computer program product comprising computer executable program code recorded on a computer readable non-transitory storage medium, the computer executable program code, when executed by a computer processor, causing performance of the steps of:

receiving at an apparatus, at least two digital streams, including a first digital stream from a first stream source and a second digital stream from a second stream source, the first digital stream including at least a first signaling channel and a first data channel and the second digital stream including a second signaling channel and a second data channel;

maintaining by the apparatus, a bidirectional signaling session for each of the at least two digital streams, including a bidirectional signaling session over the first signaling channel with the first stream source and a bidirectional signaling session over the second signaling channel with the second stream source;

decoding by the apparatus the first data channel when the apparatus is in a first state;

receiving by the apparatus, an event signal triggering state change for the apparatus; and stopping decoding of the first data stream and initiating decoding of the second data stream, if the event signal triggers a second state for the apparatus, while maintaining the signaling channels for each of the at least two digital streams.

The resulting example embodiments enable digital stream swapping between digital signal sources, enabling a user to easily and intuitively switch between the existing streams.

DESCRIPTION OF THE FIGURES

FIG. 1A illustrates an example network diagram of example embodiments for a short-range radio digital stream swapping between digital signal sources. A new event handler functionality enables swapping an existing digital stream to a next one if more than one digital stream is identified, enabling a user to easily and intuitively switch between the existing streams, in accordance with at least one embodiment of the present invention.

FIG. 1B illustrates an example network diagram of example embodiments for a wireless local area network (WLAN) radio digital stream swapping between digital signal sources. A new event handler functionality enables swapping an existing digital stream to a next one if more than one digital stream is identified, enabling a user to easily and intuitively switch between the existing streams, in accordance with at least one embodiment of the present invention.

FIG. 3B is an example flow diagram of operational steps in receiving device of FIGS. 1A, 1B, and 1C, and FIGS. 7A, 7B, and 7C, in accordance with at least one embodiment of the present invention.

FIG. 4 illustrates an example embodiment of the invention, wherein examples of removable storage media 162 are shown, in accordance with at least one embodiment of the present invention.

FIGS. 6A to 6D, illustrate an example flow diagram of the example pseudocode representation of Table I and Table II, illustrating how the example source swap function may be implemented as computer program logic that may be stored in the RAM or ROM and executed in the CPU of the processor, to enable swapping either the first data stream or the second data stream, in accordance with at least one embodiment of the present invention.

FIG. 7A illustrates an example network diagram of example embodiments for a short-range radio digital stream swapping between a plurality of "N" digital signal sources, in accordance with at least one embodiment of the present invention.

FIG. 7C illustrates an example network diagram of example embodiments for a short-range radio digital stream and wireless local area network (WLAN) radio digital streams swapping between a plurality of "N" digital signal sources, in accordance with at least one embodiment of the present invention.

DISCUSSION OF EXAMPLE EMBODIMENTS OF THE INVENTION

Figure 1C:
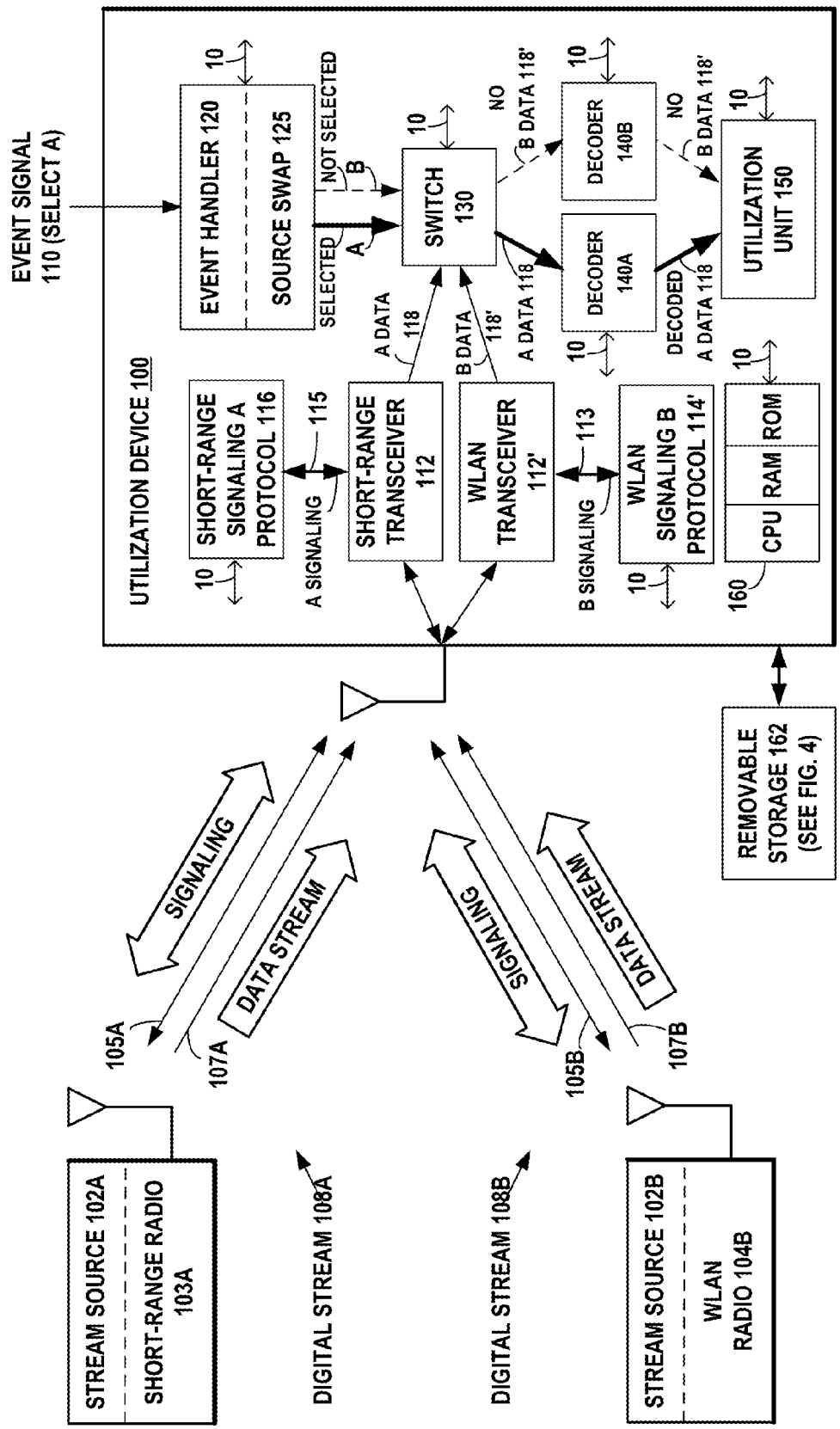
FIG. 1C illustrates an example network diagram of example embodiments for a short-range radio digital stream and a wireless local area network (WLAN) radio digital stream swapping between digital signal sources. A new event handler functionality enables swapping an existing digital stream to a next one if more than one digital stream is identified, enabling a user to easily and intuitively switch between the existing streams, in accordance with at least one embodiment of the present invention.

This section is organized into the following topics:
A. Bluetooth™ Communication Technology
B. Bluetooth™ Advanced Audio Distribution Profile (A2DP)
C. WLAN Communication Technology
D. Digital Stream Swapping Between Signal Sources
A. Bluetooth™ Communication Technology An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. On Jun. 30, 2010, the Bluetooth™ SIG published the Bluetooth™ Core Specification, Version 4.0, which includes the basic rate/enhanced data rate (BR/EDR) and additionally, the Bluetooth low energy (LE) protocol. The Bluetooth™ BR/EDR includes the extended inquiry response (EIR). An extended inquiry response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

A procedure for forming connections between Bluetooth™ BR/EDR devices is described in the Bluetooth™ Specification. The Bluetooth™ Baseband is the part of the Bluetooth™ system that implements the media access control (MAC) and physical layer procedures to support the connection formation, exchange of data information streams, and ad hoc networking between Bluetooth™ devices. Connection formation includes inquiry, inquiry scanning, inquiry response, extended inquiry response, paging, page scanning, and page response procedures.

1. Bluetooth™ BR/EDR Inquiry Request

Inquiry is a procedure where a Bluetooth™ BR/EDR device transmits inquiry messages and listens for responses in order to discover the other Bluetooth™ devices that are within the coverage area. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Inquiry scan is a procedure where a Bluetooth™ BR/EDR device listens for inquiry messages received on its inquiry scan physical channel. A device using one of its inquiry scan channels remains passive on that channel until it receives an inquiry message on this channel from another Bluetooth™ device. This is identified by the appropriate inquiry access code. The inquiry scanning device will then follow the inquiry response procedure to return a response to the inquiring device.

2. Bluetooth™ BR/EDR Inquiry Response

An inquiry response packet, which is a frequency hop synchronization (FHS) packet, is transmitted from the slave to the master after the slave has received an inquiry message. This packet contains information necessary for the inquiring master to page the slave and follows 625 microseconds after the receipt of the inquiry message. The inquiry response packet is received by the master at the hop frequency of the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR), clock, and class of device.

The clock $CLK_{27-2}$ in the FHS inquiry response packet is a 26-bit field that contains the value of the native clock CLKN of the device that sends the FHS packet, sampled at the beginning of the transmission of the access code of this FHS packet. This clock value has a resolution of 1.25 ms (two-slot interval). For each new transmission, this field is updated so that it accurately reflects the real-time clock value CLKN.

On the first inquiry message received in the inquiry scan substate the slave may enter the inquiry response substate. If the slave has non-zero extended inquiry response data to send it may return an FHS packet to the master, with the extended inquiry response bit set to one, 625 microseconds (μs) after the inquiry message was received. It may then return an extended inquiry response packet 1250 microseconds after the start of the FHS packet. If the slave's extended inquiry response data is all zeroes the slave may only return an FHS packet with the extended inquiry response bit set to zero. In step 1, the master transmits an inquiry request packet using the inquiry access code (IAC). In step 2, the slave responds with the FHS packet containing the slave's Bluetooth™ device address, native clock CLKN and other slave information. This FHS packet is returned at times that tend to be random. The FHS packet is not acknowledged in the inquiry routine, but it is retransmitted at other times and frequencies as long as the master is probing with inquiry messages. If the slave has non-zero extended inquiry response data, it sends an extended inquiry response packet to the master in step 3.

3. Bluetooth™ BR/EDR Extended Inquiry Response

An extended inquiry response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to obtain useful information. If the slave transmits an extended inquiry response packet, it is transmitted 1250 microseconds after the start of the inquiry response packet. The extended inquiry response packet is received by the master at the hop frequency when the inquiry message was received by the slave in the master-to-slave slot. The extended inquiry response packet is an asynchronous connection-oriented logical transport (ACL) data medium rate (DM) packet with type DM1, DM3, DM5, DH1, DH3 or DH5. The packet is sent on the same frequency as the (frequency hop synchronization) FHS packet, 1250 microseconds after the start of the FHS packet.

The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all inquiry access codes (IACs).

4. Bluetooth™ Clock

The Bluetooth™ basic piconet physical channel is divided into time slots, each 625 μs in length. The time slots are numbered according to the most significant 27 bits of the Bluetooth™ clock $CLK_{28-1}$ of the piconet master. The slot numbering ranges from 0 to $2^{27}$-1 and is cyclic with a cycle length of $2^{27}$. The time slot number is denoted as k. A time domain duplex (TDD) scheme is used where master and slave alternately transmit. The packet start is aligned with the slot start. CLK is the master clock of the piconet. It is used for all timing and scheduling activities in the piconet. All devices use the CLK to schedule their transmission and reception. The CLK is derived from the native clock CLKN by adding an offset. The offset is zero for the master since CLK is identical to its own native clock CLKN. Each slave adds an appropriate offset to its CLKN such that the CLK corresponds to the CLKN of the master. Although all CLKNs in the devices run at the same nominal rate, mutual drift causes inaccuracies in CLK. Therefore, the offsets in the slaves are regularly updated such that CLK is approximately CLKN of the master.

The master transmission starts at even numbered time slots (CLK bit 1 equals 0 or $CLK_1=0$) and the slave transmission always starts at odd numbered time slots (CLK bit 1 equals 1 or $CLK_1=1$). Due to packet types that cover more than a single slot, master transmission may continue in odd numbered slots and slave transmission may continue in even numbered slots.

The channel hopping frequencies f(k) change with the time slot number k. After transmission, a return packet is expected 625 μs after the start of the transmitted packet, depending on the type of the transmitted packet. Each master transmission is derived from bit 2 of the Master's native Bluetooth™ clock CLKN, thus the current transmission will be scheduled M×1250 µs after the start of the previous master transmitted (TX) burst, where M depends on the transmitted and received packet type and is an even, integer larger than 0. The master TX timing is derived from the master's native Bluetooth™ clock CLKN, and thus it will not be affected by time drifts in the slave devices.

Slave devices maintain an estimate of the master's native clock CLKN by adding a timing offset to the slave's native clock. This offset is updated each time a packet is received from the master. By comparing the exact received (RX) timing of the received packet with the estimated RX timing, slaves may correct the offset for any timing misalignments. Since only the channel access code is required to synchronize the slave, slave RX timing may be corrected with any packet sent in the master-to-slave transmission slot. The slave's transmission is scheduled 625 µs after the start of the slave's RX packet. If the slave's RX timing drifts, so will its TX timing.

5. Bluetooth™ Host Controller Interface

The host controller interface (HCI) is described in the Bluetooth™ Core Specification. The HCI provides a command interface between the host application in a device and the Bluetooth™ link layer, provides access to hardware status and control registers of the Bluetooth™ radio, and provides a uniform method of accessing the Bluetooth™ baseband capabilities. Some of the HCI commands and events are described as follows.

HCI Read Clock Command:

This command reads the estimate of the value of the Bluetooth™ Clock CLKN from the device's controller and passes it on to the Host. If the Which_Clock value is 0, then the Connection_Handle is ignored and the local Bluetooth™ Clock value is returned and the accuracy parameter is set to 0. If the Which_Clock value is 1, then the Connection_Handle is a valid Asynchronous Connection-oriented Logical transport (ACL) Connection_Handle. If the current role of this ACL connection is Master, then the Bluetooth™ Clock CLKN of this device is returned. If the current role is Slave, then an estimate of the Bluetooth™ Clock of the remote master and the accuracy of this value are returned. The accuracy reflects the clock drift that might have occurred since the slave last received a valid transmission from the master.

HCI Read Clock Offset Command:

Both the system clock and the clock offset to a remote device are used to determine what hopping frequency is used by a remote device for page scan. This command allows the host to read clock offset to remote devices. The clock offset may be used to speed up the paging procedure when the local device tries to establish a connection to a remote device, for example, when the local host has issued Create_Connection or Remote_Name_Request. The Connection_Handle must be a Connection_Handle for an ACL connection.

HCI Inquiry Result Event:

The inquiry result event indicates that a remote device has responded with an inquiry response packet during the current Inquiry process. This event will be sent from the Bluetooth™ Controller to the Host as soon as an Inquiry Response from a remote device is received. The event parameters sent to the Host include BD_ADDR and Class_of_Device of the remote device and Clock_Offset between the remote device and the inquiring device.

HCI Write Extended Inquiry Response Command:

The Write_Extended_Inquiry_Response command writes the extended inquiry response to be sent to an inquiring device during the extended inquiry response procedure. The write extended inquiry response command will write the data that the device's host wishes to send in the extended inquiry response packet during inquiry response. The FEC_Required command parameter states if forward error correction (FEC) encoding is required. The initial value of the inquiry response data is all zero octets. The controller does not interpret the extended inquiry response data, but passes it on to the baseband medium access control and physical radio for transmission in an EIR packet.

HCI Extended Inquiry Result Event:

The extended inquiry result event indicates that another Bluetooth™ device has responded during the current inquiry process with extended inquiry response data. Data received in this event will be sent from the device's Controller to the Host upon reception of an EIR from a remote device. One single extended inquiry response is returned per event. This event contains received signal strength indication (RSSI) and inquiry response data for the device that responded to the latest inquiry. The RSSI parameter is measured during the FHS packet returned by each responding slave. The Num_Responses parameter is set to one. If an extended inquiry response packet from the same remote device is correctly received in a later response, another event is generated. The Extended_Inquiry_Response parameter is not interpreted by the controller. The tagged data received from the remote device is passed unaltered to the host, if it has been correctly received.

6. Bluetooth™ Low Energy (LE)

On Jun. 30, 2010, the Bluetooth SIG published the Bluetooth Core Specification, Version 4.0, which includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 8 octets to a maximum of 27 octets, giving it a low duty cycle. Bluetooth LE employs a frequency hopping transceiver with many frequency hopping spread spectrum (FHSS) carriers, with a bit rate of 1 Megabit per second (Mb/s).

B. Bluetooth™ Advanced Audio Distribution Profile (A2DP)

The Bluetooth™ Advanced Audio Distribution Profile (A2DP) defines the protocols and procedures to enable distribution of audio content of high-quality in mono or stereo on asynchronous connectionless (ACL) channels. The term "advanced audio" may be distinguished from "Bluetooth audio" that indicates distribution of narrow band voice on synchronous connection oriented (SCO) channels.

A typical usage case may be the streaming of music content from a stereo music player to headphones or speakers. The audio data may be compressed in a proper format for efficient use of the limited bandwidth.

The A2DP focuses on audio streaming, while the Video Distribution Profile (VDP) specifies video streaming. Support of both profiles enables distribution of video content accompanied with high-quality audio.

The A2DP is dependent upon the Generic Access Profile (GAP), as well as the Generic Audio/Video Distribution Profile (GAVDP), which defines procedures required to set up an audio/video streaming. The A2DP defines parameters and procedures that are specific for audio streaming.

1. Bluetooth™ Generic Access Profile

The Bluetooth™ Generic Access Profile (GAP) defines the generic procedures related to discovery of Bluetooth devices (idle mode procedures), link management aspects of connecting to Bluetooth devices (connecting mode procedures, and procedures related to use of different security levels. The Bluetooth™ Generic Access Profile describes how the lower layers (link manager protocol (LMP) and Baseband) are used, along with some higher layers. The main purpose of the Bluetooth™ Generic Access Profile is to describe the use of the lower layers of link control (LC) and link manager protocol (LMP) of the Bluetooth protocol stack.

The Bluetooth™ Generic Access Profile describes the roles that the two devices involved in a Bluetooth communication may take. The paging device, in case of link establishment, or initiator in case of another procedure on an established link, may be called the A-party. The initiator (INT) for a given procedure, initiates the establishment of the physical link or initiates a transaction on an existing link. The paged device or responding device is the acceptor (ACP). The initiator and the acceptor generally operate the generic procedures according to the Bluetooth™ Generic Access Profile or another profile, such as the Bluetooth™ Advanced Audio Distribution Profile (A2DP), referring to this profile.

Before establishment procedures are initiated, the information provided during device discovery, for example, in the frequency hopping sequence (FHS) packet of the inquiry response or in the response to a name request, has to be available in the initiating device. This information includes the Bluetooth Device Address (BD_ADDR) from which the Device Access Code is generated, the system clock of the remote device; and the page scan mode used by the remote device. The purpose of the link establishment procedure is to establish a physical link (of ACL type) between two Bluetooth devices. It typically involves two stages: Paging and Link Setup. The purpose of the channel establishment procedure is to establish a Bluetooth channel (a logical link) between two Bluetooth devices. Channel establishment starts after link establishment is completed when the initiator sends a channel establishment request. The purpose of the connection establishment procedure is to establish a connection between applications on two Bluetooth devices.

2. Bluetooth™ Generic Audio/Video Distribution Profile (GAVDP)

The Generic Audio/Video Distribution Profile (GAVDP) defines a generic part of the protocols and procedures that realize distribution of audio content and/or video content using ACL channels. The profile specifies signaling transaction procedures between two devices to set up, terminate and reconfigure streaming channels. Streaming parameters and encode/decode features are included in Advanced Audio Distribution Profile and Video Distribution Profile that depend on this profile. The Generic Audio/Video Distribution Profile is used in combination with profiles that depend on this profile.

The Baseband, link manager protocol (LMP), logical link control and adaptation protocol (L2CAP), and service discovery protocol (SDP) are Bluetooth protocols defined in the Bluetooth Core specifications. AVDTP consists of a signaling entity for negotiation of streaming parameters and a transport entity that handles the streaming.

The Initiator (INT) role and the Acceptor (ACP) role are defined for devices that implement this profile. The Initiator (INT) is the device that initiates a signaling procedure. The Acceptor (ACP) is the device that may respond to an incoming request from the INT.

The roles are not fixed to the devices. The roles are determined when the user initiates a signaling procedure defined below and they are released when the procedure ends. The roles can be switched between two devices when a new procedure is initiated.

The following two scenarios are covered by the Generic Audio/Video Distribution Profile (GAVDP): [1] Set up two devices for audio/visual (A/V) data streaming that flows from one end to another, and then connect these devices with Bluetooth transaction. [2] Control the established streaming.

Fundamentals of the Generic Audio/Video Distribution Profile (GAVDP)

The Generic Audio/Video Distribution Profile (GAVDP) is based on Bluetooth v.1.1 specification. The following is a brief summary of the interactions that take place when the INT wishes to send messages to the Acceptor (ACP).

A link may be established before a signaling session starts.

There are no fixed master/slave roles.

Use of security features in link level such as authorization, authentication and encryption are optional. Support for authentication and encryption is mandatory, such that the device can take part in the corresponding procedures if requested from a peer device.

AVDTP Interoperability Requirements

Signaling Procedures

In AVDTP, the interoperability requirements for the signaling entity employ three states of GAVDP:

<IDLE>: The initial state where no streaming connection has been established, while logical link control and adaptation protocol (L2CAP) channel for signaling is already open.

<OPEN>: The streaming connection has been established between two devices.

<STREAMING>: Both devices are ready for streaming.

Connection Establishment:

This Connection Establishment procedure may be used when a device wishes to establish a streaming connection with the other device. Prior to initiating this procedure, an L2CAP channel for signaling may be established. The initial state of the both devices is <IDLE>. Then, the Initiator (INT) may initiate Stream Endpoint (SEP) Discovery procedure of AVDTP if the INT has not collected SEP information before, or wishes to refresh it. Then, Get Capabilities procedure of AVDTP should be initiated to collect service capabilities of the Acceptor (ACP) using the Stream Endpoint (SEP) information. This procedure does not have to be executed when the INT already knows the services provided by the Acceptor (ACP).

Based on collected Stream Endpoint (SEP) information and service capabilities, the Initiator (INT) may select specific services and configure the Acceptor (ACP) by using the Stream Configuration procedure defined in AVDTP. Then, logical link control and adaptation protocol (L2CAP) channels are established as defined in the Stream Establishment procedure in AVDTP. Finally, the states of both devices are set at <OPEN>, and the INT/ACP roles are released after the procedure.

To start a stream, the Start Streaming procedure below may be initiated to confirm if both devices are ready for streaming and change the state from <OPEN> to <STREAMING>.

Start Streaming

When the device wishes to start or resume the A/V streaming, this procedure may be initiated to change the state from <OPEN> to <STREAMING>. The Initiator (INT) initiates Start Streaming procedure of AVDTP by a user initiated action or an internal event. The streaming may be started/resumed after this procedure.

Connection Release

The INT initiates the Stream Release procedure of AVDTP to release L2CAP channels for streaming. This procedure may be initiated both from <OPEN> and <STREAMING>, and set the state at <IDLE> for both devices. The L2CAP channel for signaling may be released after this procedure, if necessary.

Suspend

When the device wishes to suspend the A/V streaming, the procedure may be initiated to change the state from <STREAMING> to <OPEN>. The INT initiates Stream Suspend procedure of AVDTP by a user initiated action or an internal event. The streaming may be suspended after the procedure.

Change Parameters

In order to change the application service parameters, both devices may be in <OPEN> state. If the state is <STREAMING> the Suspend procedure above may be executed beforehand to suspend the stream and change the state to <OPEN> for both devices. The procedure is initiated by a user action or an internal event. If the INT has not obtained service capability information of the ACP by then, the Get Capabilities procedure of AVDTP is executed first. Then, the INT selects and specifies new parameters according to the information and requests the ACP to reconfigure these parameters with the Stream Reconfigure procedure of AVDTP. After closing this procedure, the state of the devices remains <OPEN>. It is necessary to initiate Start Streaming procedure above to resume the stream.

Signaling Control

This procedure may be used to recover from a loss of a signaling message, which could result in inconsistency of the INT and the ACP.

Security Control

The procedure may be used to exchange security control messages between the INT and the ACP.

3. Bluetooth™ Advanced Audio Distribution Profile (A2DP) Signaling

Once a stream connection is established between the INT and the ACP, the devices are ready to transport A/V data. AVDTP provides several transport services related to basic transport, quality of service and manipulation of transport packets for efficient use of the bandwidth.

The GAVDP Profile defines an 8-bit ERROR_CODE field that is transported over the air in signaling response messages when an ACP device rejects a signaling command message received from a distant INT device. The ERROR_CODE field received from an ACP device is exposed to the INT application through the AVDTP service interface.

Bluetooth L2CAP Procedures:

In the AVDTP profile, only connection-oriented channels may be used. This implies that broadcasts may not be used in this profile. The AVDTP protocol/service multiplexer (PSM) value is used in the L2CAP connection request.

Only the INT issues an L2CAP Connection Request within the execution of Connection Establishment procedure in this profile. The GAVDP does not impose any additional restrictions or requirements on L2CAP signaling.

Configuration options in the AVDTP profile include:

Maximum Transmission Unit (MTU): The minimum MTU that a L2CAP implementation for this profile may support is 48 bytes.

Reliability: The flush timeout value may be defined in the profiles dependent on GAVDP.

Quality of Service: Negotiation of Quality of Service is optional in this profile.

For the Bluetooth Link Manager, the procedure for SCO links is excluded in the AVDTP profile. Except for this, there is no change to the requirements as stated in the Link Manager specification itself.

For the Bluetooth Link Control, the GAVDP Profile lists all features on the Bluetooth Link Control level, as well as the extra requirements added to the Baseband specification by the AVDTP profile.

For the Bluetooth Generic Access Profile Interoperability Requirements, the GAVDP requires compliance to the Generic Access Profile. GAVDP defines the support requirements with regards to procedures and capabilities defined in the Generic Access Profile. This shows the support status for modes within this profile and the support status for idle mode procedures within this profile.

There is no change to the Security Aspects requirements as stated in the Generic Access Profile.

The Baseband, LMP, L2CAP, and SDP are Bluetooth protocols defined in the Bluetooth Core specifications. AVDTP consists of a signaling entity for negotiation of streaming parameters and a transport entity that handles streaming itself. The Application layer is the entity in which the device defines application service and transport service parameters. The entity also adapts the audio streaming data into the defined packet format, or vice versa.

The following roles are defined for devices that implement this profile: Source (SRC)—A device is the SRC when it acts as a source of a digital audio stream that is delivered to the SNK of the piconet. Sink (SNK)—A device is the SNK when it acts as a sink of a digital audio stream delivered from the SRC on the same piconet. Examples of configurations illustrating the roles for this profile are depicted in When a device wishes to start streaming of audio content, the device initially needs to set up a streaming connection. Signaling procedures and typical signaling flows are illustrated in GAVDP. During such set up procedure, the devices select the most suitable audio streaming parameters. There are two kinds of services configured; one is an application service capability, and the other is a transport service capability. This profile specifies audio-specific parameters necessary for these signaling procedures.

The application service capability for A2DP consists of audio codec capability and content protection capability. The transport service capability is provided by AVDTP in order to manipulate the streaming packets more intelligently. Appropriate configuration of these services increases channel throughput.

Once streaming connection is established and Start Streaming procedure in GAVDP is executed, both SRC and SNK are in the STREAMING state, in which the SRC (SNK) is ready to send (receive) audio stream. The SRC uses the Send Audio Stream procedure to send audio data to the SNK, which in turn employs the Receive Audio Stream procedure to receive the audio data.

The devices may be in the STREAMING state to send/receive audio stream. If the SRC/SNK wishes to send/receive the audio stream whereas the state is still at OPEN, the SRC/SNK may initiate Start Streaming procedure defined in GAVDP.

In the Send Audio Stream procedure, the SRC may, if needed, encode the data into a selected format in the signaling session. Then, the application layer of the SRC may adapt the encoded data into the defined media payload format. The frame of encoded audio data is adapted to the defined payload format.

When content protection is in use, a content protection header may precede encrypted audio content. This is content protection method dependent.

Afterwards, the stream data may be handed down to the AVDTP entity through the exposed interface defined in AVDTP. The stream data may be sent out on the transport channel using the selected transport services.

The AVDTP entity of the SNK may receive the stream data from the transport channel using the selected transport services and pass it to the application layer by exposed interface.

When a content protection method is active, the application layer of the SNK may process the retrieved AVDTP payload as described by the content protection method. Typically, this processing entails content protection header analysis and decryption of associated encrypted content.

If applicable, the frame of audio data may be decoded according to the selected coding format.

C. WLAN Communication Technology

The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard IEEE 802.11-2007, Wireless Medium Access Control (MAC) and Physical Layer (PHY) Specifications, June 2007. Since then, emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

A WLAN may be organized as an independent basic service set (IBSS) or an infrastructure basic service set (BSS). Wireless devices in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format is identical to that of an IEEE 48-bit address. In an ad hoc network, the BSSID is a locally administered, individual address that is generated randomly by the device that starts the ad hoc network.

Synchronization is the process of the devices in an ad hoc network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of an ad hoc network, and inquiring to find an ad hoc network. Once an ad hoc network is found, a device joins the ad hoc network. This process is entirely distributed in ad hoc networks, and relies on a common time base provided by a timer synchronization function (TSF). The TSF may maintain a 64-bit timer running at 1 MHz and updated by information from other devices. When a device begins operation, it may reset the timer to zero. The timer may be updated by information received in beacon frames.

In an ad hoc network, since there is no access point (AP) to act as the central time source for the ad hoc network, the timer synchronization mechanism is completely distributed among the mobile devices of the ad hoc network. Since there is no AP, the mobile device that starts the ad hoc network will begin by resetting its TSF timer to zero and transmitting a Beacon, choosing a beacon period. This establishes the basic beaconing process for this ad hoc network. After the ad hoc network has been established, each device in the ad hoc network will attempt to send a Beacon after the target beacon transmission time (TGTT) arrives. To minimize actual collisions of the transmitted Beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process is a purely local process that occurs entirely internal to the mobile device. There is no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

1. Beacon

The beacon frame is a management frame that is transmitted periodically to allow mobile devices to locate and identify an ad hoc network. The beacon frame includes the fields: timestamp, beacon interval, and capability information. The timestamp contains the value of the device's synchronization timer at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, an optional ad hoc network parameter set, and an optional traffic indication map. There is no restriction on the format or content of the 32 byte SSID.

The first ad hoc device to become active establishes an IBSS and starts sending beacons that to maintain synchronization among the devices. Other ad hoc devices may join the network after receiving a beacon and accepting the IBSS parameters, such as the beacon interval, found in the beacon frame.

Each device that joins the ad hoc network may send a beacon periodically if it doesn't hear a beacon from another device within a short random delay period after the beacon is supposed to be sent. If a device doesn't hear a beacon within the random delay period, then the device assumes that no other devices are active and a beacon needs to be sent.

A beacon signal is periodically transmitted from the ad hoc network. The beacon frame is transmitted periodically and includes the address of the sending device.

2. Probe Request

The probe request frame is a management frame that is transmitted by a mobile device attempting to quickly locate a wireless LAN. It may be used to locate a wireless LAN with a particular SSID or to locate any wireless LAN. The probe request frame may contain the service attribute request. The effect of receiving a probe request is to cause the device to respond with a probe response. When a wireless device arrives within the communication range of any member of an ad hoc network, its probe request frame inquiry signals are answered by a member of the ad hoc network detecting the inquiry. A device in an ad hoc network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

For active scans, the WLAN radio broadcasts a probe request on the channel it is scanning using a broadcast SSID in the probe request. The WLAN radio will add any received beacons or probe responses to a cached basic service set identifier (BSSID) scan list. For passive scans, the WLAN radio does not send a probe request, but instead, listens on a channel for a period of time and adds any received beacons or probe responses to its cached BSSID scan list. The WLAN radio may scan both infrastructure and ad hoc networks, regardless of the current setting of its network mode. The WLAN radio may use either the active or passive scanning methods, or a combination of both scanning methods. When performing an active scan, the WLAN radio sets the BSSID to the broadcast MAC address in the probe request it sends. The WLAN radio performs the scan across all the frequency channels and bands that it supports.

3. IEEE WLAN 802.11 Signaling

IEEE WLAN 802.11 signaling is defined in the IEEE 802.11-2007, Wireless Medium Access Control (MAC) and Physical Layer (PHY) Specifications, June 2007.

The IEEE 802.11 wireless devices, STAs, use the CSMA/CA access method of the IEEE 802.11 WLAN standard to gain access to the wireless medium. A first device detects that it is frequently delayed in beginning transmissions to a second device, because a third device is a frequent user of the medium. The first device determines from the addresses in the packets it overhears from the third device that the third device is transmitting its packets to a fourth device whose reply transmissions are not received by the first device. In a device pair, when the second device receives any transmissions from the first device, it delays sending any reply until after the expiration of the current transmit opportunity (TXOP) in which the first device has transmitted.

The first packet will have the standard IEEE 802.11 frame format, which is a PLCP protocol data unit (PPDU). The PPDU represents the physical packet as it is transmitted in the RF medium. The PPDU consists of a physical layer conversion procedure (PCLP) preamble, a PLCP header, and a MAC protocol data unit (MPDU). The PLCP header includes the length L of the MPDU and its data rate R. From these values, the first device calculates the duration of the PPDU of both the first packet and the second packet.

The second device is obliged to delay transmitting any packet until after the expiration of the current transmit opportunity (TXOP) in which the first device has transmitted the second message. The NAV value T is defined in the packets transmitted by the third device. The value of T is decremented as time passes, so that the value of T that the first device inserts into the MPDU of the second packet and transmits to the second device, is the remaining duration before the expiration of the NAV. Thus, the protection area to avoid interference and transmission collisions is increased and second device knows by how much it delays any replies to the first device after receiving the second packet.

The first device competes with the second device and the third device for transmission resources using the carrier sense multiple access with collision avoidance (CSMA/CA) access method according to an embodiment of the present invention. In the IEEE 802.11 protocols, CSMA/CA may be carried out by the exchange of a Request to Send (RTS) packet sent by the sender and a Clear to Send (CTS) packet sent in reply by the intended receiver, alerting all other devices within range of the sender or the receiver, to refrain from transmitting for the duration of the main packet. The network allocation vector (NAV) is an indicator maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame update their NAV with the information received in the duration field T for all frames where the new NAV value is greater than the current NAV value, including the RTS and CTS packets, as well data packets. The devices monitor the transmissions that are ongoing in the media and may listen to other transmitters in the media.

The IEEE 802.11 enhanced distributed channel access (EDCA) contention access is an extension of the CSMA/CA mechanism to include priorities. The contention window and backoff times in CSMA/CA are adjusted to change the probability of a STA gaining medium access to favor higher priority classes. Each priority is mapped to one of four access categories (AC). Under EDCA, STAs use the same CSMA/CA access mechanism and contend on an equal basis at a given priority. A STA that wins an EDCA contention is granted a transmission opportunity (TXOP), which is the right to use the medium for a period of time. The duration of this TXOP is specified for each access category. A STA may use a TXOP to transmit multiple frames within an access category. If the frame exchange sequence has been completed and there is still time remaining in the TXOP, the STA may extend the frame exchange sequence by transmitting another frame in the same access category. The STA ensures that the transmitted frame and any necessary ACK can fit into the time remaining in the TXOP.

The network allocation vector (NAV) is an indicator of time periods when transmission onto the wireless medium will not be initiated by a STA. STAs receiving a valid frame will update their NAV with the information received in the duration field T for all frames where the new NAV value is greater than the current NAV value, including the RTS and CTS packets, as well data packets. An example RTS packet has a NAV T1 for a duration from the end of the RTS packet to the end of the ACK packet transmitted as a reply. This RTS effectively prevents other STAs within the coverage area from transmitting during the TXOP. The CTS packet has a NAV T2 for a duration continuing from the end of the CTS packet to the end of the ACK packet transmitted as a reply. This CTS effectively prevents other STAs within the coverage area from transmitting during the TXOP. The data packet transmitted has a NAV T3 for a duration continuing from the end of the data packet to the end of the ACK packet transmitted.

The physical layer convergence procedure (PLCP) protocol data unit (PPDU) in the IEEE 802.11 standard, illustrating the formats of its component physical layer convergence procedure (PLCP) and MAC Protocol Data Unit (MPDU) according to an embodiment of the present invention. The packets are generally organized with the standard IEEE 802.11 frame format described in the IEEE 802.11-2007, "Wireless Medium Access Control (MAC) and Physical Layer (PHY) Specifications," June 2007. The format for the physical packet transmitted through the RF medium is the PPDU frame format, which consists of three parts: the PLCP preamble, the PLCP header, and the MAC Protocol Data Unit (MPDU). The PLCP Preamble provides synchronization bits to synchronize the physical layer radios of the communicating STAs. The PLCP Header provides, among other information elements, transmission rate R and length L of the MPDU that may be applied to calculate the overall duration of the PPDU. The MAC header contains frame control information, the duration T that is applied to set the duration for NAV for virtual carrier sensing protection after the transmitted packet, the address of the intended receiving STA, and the address of the transmitting STA. In the case of RTS and CTS packets, the duration value T is the remaining duration of the NAV protected time that the transmitter of the TXOP may use to for transmitting the data packet with which they are associated. The frame body contains the variable length payload of the packet, which may be management or control parameters, data, or encapsulated envelopes of data. The Frame Check Sequence (FCS) field is a check sum to verify the integrity of the MAC header and payload. The PLCP, itself, has a known number of bits and data rate for each type of transmission modulation in the IEEE 802.11 standard, and has a duration P. The overall duration of the PPDU is the sum of the duration P of the PLCP and the duration of the MPDU computed from the transmission rate R and length L. However, the PLCP length P is on the order of 100 bits, which may be considered negligible and may be ignored when compared to the much larger length of the MPDU, which may be as large as 32,000 bits.

The STAs may operate, for example, in the same BSS, independent BSS (IBSS) or mesh BSS. If devices operate in the same BSS, they may have established a tunneled direct link that enables the devices to transmit directly between the non-access point (AP) STAs. It is also possible that either of the STAs is an access point (AP) and the other is a non-AP STA (normal terminal). Example embodiments of the invention operate in all network topologies, including an IEEE 802.11 Basic Service Set (BSS), a Peer-to-peer BSS, a Mesh BSS (MBSS), an Independent BSS (IBSS) and a Tunneled Direct Link BSS (IEEE 802.11z). Example embodiments of the invention enhance the CSMA/CA access method operating in all frequency bands, for example from country specific white spaces between 50 and 700 MHz, the 2.4 GHz ISM band, the 5.0 GHz band for the IEEE 802.11ac standard, up beyond the 60 GHz band for the IEEE 802.11ad standard.

4. IEEE WLAN 802.11 Unicast Streaming

IEEE WLAN 802.11 unicast streaming may be carried out with the IEEE 802.11 protocols, for example, the IEEE 802.11g, the IEEE 802.11n, and the planned IEEE 802.11ac WLAN protocols that provide a very high throughput.

In example embodiments of the invention, a stream source may have a high priority class and high access category (AC). A STA stream source may be granted a relatively long transmission opportunity (TXOP) to transmit multiple frames within its access category. If the frame exchange sequence has been completed and there is still time remaining in the TXOP, the STA may extend the frame exchange sequence by transmitting another frame in the same access category. The STA ensures that the transmitted frame and any necessary ACK can fit into the time remaining in the TXOP.

STAs receiving a valid frame may update their NAV with the information received in the duration field T for all frames where the new NAV value is greater than the current NAV value, including the RTS and CTS packets, as well data packets. An example RTS packet has a NAV T1 for a duration from the end of the RTS packet to the end of the ACK packet transmitted as a reply. This RTS effectively prevents other STAs within the coverage area from transmitting during the TXOP. The CTS packet has a NAV T2 for a duration continuing from the end of the CTS packet to the end of the ACK packet transmitted as a reply. This CTS effectively prevents other STAs within the coverage area from transmitting during the TXOP. The data packet transmitted has a NAV T3 for a duration continuing from the end of the data packet to the end of the ACK packet transmitted.

The physical layer convergence procedure (PLCP), itself, has a known number of bits and data rate for each type of transmission modulation in the IEEE 802.11 standard, and has a duration P. The overall duration of the protocol data unit (PPDU) is the sum of the duration P of the PLCP and the duration of the MAC Protocol Data Unit (MPDU) computed from the transmission rate R and length L. The PLCP length P of the digital stream may be as large as 32,000 bits.

D. Digital Stream Swapping Between Signal Sources

In accordance with one example embodiment of the invention, a digital stream may be defined as a sequence of digital signals representing a sequence of discrete-values, which is transmitted through a wireless medium from a transmitter to a receiver. Accordingly, the sequence of discrete values may be derived from sampling over time a continuous-valued physical process, for example as acoustically sampling sounds, optically sampling a two-dimensional scene in motion, or sampling over time with a sensor an ambient temperature, pressure, or other physical condition. For example, sounds may be converted by a microphone into an electrical voltage signal that is sampled over time and encoded by a codec into a sequence of binary digital signals that are transmitted as a digital stream by a wireless transmitter over a wireless medium to a wireless receiver, where the binary digital signals are decoded by a codec and reconverted into sounds. Included in the digital stream may be a bi-directional signaling channel that specifies transaction procedures between the transmitter and receiver to set up, manage, reconfigure, and terminate the digital stream.

In accordance with one example embodiment of the invention, the sequence of discrete values represented by the digital signals in a digital stream may be encoded as integers representing information. For example, a data processor may have encoded the human-readable words in a document into ASCII encoded text and stored the encoded text in the processor's memory as a sequence of binary values. The sequence of binary values may then be read out of the memory and transmitted as a digital stream of binary signals by a wireless transmitter over a wireless medium to a wireless receiver, where the binary signals may be decoded by another data processor, from the ASCII code into the human-readable words of the document. Included in the digital stream may be a bi-directional signaling channel that specifies transaction procedures between the transmitter and receiver to set up, manage, reconfigure, and terminate the digital stream.

Real-time signals may be wirelessly transmitted in a digital stream from a stream source transmitting device to a stream receiving device. Examples of real-time signals may include high quality mono or stereo audio signals and video signals that may be wirelessly transmitted in a digital stream. Specialized protocols have been established to enable wireless distribution of high-quality mono or stereo audio content and high quality video content.

For example, in connection with the Bluetooth technology, the Bluetooth™ Advanced Audio Distribution Profile (A2DP) defines protocols and procedures to enable distribution of audio content of high-quality in mono or stereo on asynchronous connectionless (ACL) channels. A typical usage case may be the streaming of music content from a stereo music player to headphones or speakers. When a user has several Bluetooth stereo source devices connected to a single output device, such as speakers or headphones, each source device may be simultaneously streaming music to the headphones, independently of the other sources. In accordance with an example embodiment of the invention, the user may control which source plays in the headphones by allowing the user to swap between music sources with just one action on the headphones, for example with a button press, voice command, gesture, etc., rather than by performing several actions on both music sources.

FIG. 1A illustrates an example network diagram according to an example embodiment for a utilization device 100, a first stream source 102A, and a second stream source 102B. The first stream source 102A includes a short-range radio 103A that transmits a first digital stream 108A including a first signaling channel 105A and a first data stream 107A, which is received by the utilization device 100. The second stream source 102B includes a short-range radio 103B that transmits a second digital stream 108B including a second signaling channel 105B and a second data stream 107B, which is received by the utilization device 100. The first data stream 107A and the second data stream 107B may contain audio content of high-quality in mono or stereo, video content, or audio/video content. In an example embodiment of the invention, the first digital stream 108A and the second digital stream 108B may be Bluetooth™ digital streams of audio content transmitted using the Bluetooth™ Advanced Audio Distribution Profile (A2DP).

In accordance with one example embodiment of the invention, the first data stream 107A and the second data stream 107B may transmit a sequence of encoded integers representing information, such as ASCII encoded text. In this example embodiment, the first digital stream 108A and the second digital stream 108B may be Bluetooth™ digital streams using the Point-to-Point Protocol (PPP) data link protocol commonly used in establishing a direct connection between two networking nodes.

In an example embodiment of the invention, the utilization device 100 may comprise, for example, headphones, a speaker, a mobile phone, or a laptop computer.

The utilization device 100 may be, for example, an audio playing device, a video playing device, an audio/video playing device, other forms of audio/visual equipment or data processing equipment, in an example embodiment of the invention. The utilization device 100 may be configured to receive an event signal 110 that occurs as a result of, for example, a button press, a voice command, a gesture, a timer, or a signal from a sensor that senses a condition such as temperature, pressure, light level, electromagnetic wave signals, or other event phenomena. In accordance with an example embodiment of the invention, information 118 from the first data stream 107A or information 118' from the second data stream 107B may be utilized by a utilization unit 150 in the utilization device 100.

In accordance with one example embodiment of the invention, if the data streams 107A and 107B represent audio signals and the utilization unit 150 is an audio output device such as a speaker or headphones, then an audio output will be produced if either the information 118 from the first data stream 107A or the information 118' from the second data stream 107B is input to the utilization unit 150.

In accordance with another example embodiment of the invention, if the data streams 107A and 107B represent a sequence of encoded integers representing information, such as ASCII encoded text, and the utilization unit 150 is a data processing device, then a human-readable text may be produced if either the information 118 from the first data stream 107A or the information 118' from the second data stream 107B is input to the utilization unit 150.

An example utilization unit 150 that may be contained within the utilization device 100, may be an electrical/acoustic transducer to reproduce sounds for headphones, a speaker, and a mobile phone, and a programmed central processor to reproduce human-readable text for a laptop computer.

The first digital stream 108A and the second digital stream 108B are received by the short-range transceiver 112 of the utilization device 100. The first data stream 107A and the second data stream 107B may be separated from their respective streams 108A and 108B and respectively forwarded as "A" data 118 or "B" data 118' to the switch 130.

In accordance with one example embodiment of the invention, an event handler 120 in the utilization device 100, includes a source swap function 120 that enables swapping between the first data stream 107A or the second data stream 107B. The swap function 120 controls the switch 130 to either pass the first data stream 107A or the second data stream 107B.

If the first data stream 107A is selected in response to the event signal 110, then the first data stream 107A will be forwarded as "A" data 118 to the decoder 140A. Alternately, if the second data stream 107B is selected in response to the event signal 110, then the second data stream 107B will be forwarded as "B" data 118 to the decoder 140B.

In accordance with yet another example embodiment of the invention, if the data streams 107A and 107B represent audio signals, then the first and the second decoders 140A and 140B may be audio codecs. Alternately, if the data streams 107A and 107B represent a sequence of encoded integers representing information, such as ASCII encoded text, then the first and the second decoders 140A and 140B may be ASCII character decoders. The decoded output from the decoders 140A and 140B may be input to the utilization unit 150.

The first signaling channel 105A is separated from its digital stream 108A and sent as "A" signaling 115 to the first short-range signaling "A" protocol 116. In accordance with an example embodiment of the invention, the first signaling protocol 116 continues a normal bidirectional signaling session with the first short-range radio 103A in the first stream source 102A, without regard for whether or not the first data stream 107A has been selected by the event signal 110 for input to the utilization unit 150.

The second signaling channel 105B is separated from its digital stream 108B and sent as "B" signaling 113 to the second short-range signaling "B" protocol 114. In accordance with an example embodiment of the invention, the second signaling protocol 114 continues a normal bidirectional signaling session with the second short-range radio 103B in the second stream source 102B, without regard for whether or not the second data stream 107B has been selected by the event signal 110 for input to the utilization unit 150.

In accordance with an example embodiment of the invention, when the event signal 110 indicates a selection for the first digital stream 108A, the source swap function 120 in the event handler 120, outputs a "Selected A" control signal to the switch 130 that then passes the "A" data 118 to the decoder 140A, to decode the "A" data 118. The decoded "A" data is then input to the utilization unit 150. For example, if the data stream 107A represents audio signals and the utilization unit 150 is an audio output device such as a speaker or headphones, then audio output will be produced when the decoded "A" data 118 from the first data stream 107A is input to the utilization unit 150. During this session when the decoded "A" data 118 from the first data stream 107A is input to the utilization unit 150, the second signaling protocol 114 continues a normal bidirectional signaling over the second signaling channel 105B with the second short-range radio 103B in the second stream source 102B, even though the second data stream 107B has not been selected by the event signal 110 for input to the utilization unit 150.

Alternately, when the event signal 110 indicates a selection for the second digital stream 108B, the source swap function 120 in the event handler 120, outputs an "Selected B" control signal to the switch 130 that then passes the "B" data 118' to the decoder 140B, to decode the "B" data 118'. The decoded "B" data is then input to the utilization unit 150. For example, if the data stream 107B represents audio signals and the utilization unit 150 is an audio output device such as a speaker or headphones, then audio output will be produced when the decoded "B" data 118' from the second data stream 107B is input to the utilization unit 150. During this session when the decoded "B" data 118' from the second data stream 107B is input to the utilization unit 150, the first signaling protocol 116 continues a normal bidirectional signaling over the first signaling channel 105A with the first short-range radio 103A in the first stream source 102A, even though the first data stream 107A has not been selected by the event signal 110 for input to the utilization unit 150.

To summarize at least one example embodiment of the present invention, an example method at an apparatus 100 comprises:

receiving an initial active stream 108A at an apparatus 100, the initial active stream 108A including at least a first signaling channel 105A and a first data channel 107A that is decoded and applied to a utilization device 100;

receiving an alternate stream 108B at the apparatus 100, the alternate stream 108B including a second signaling channel 105B and a second data channel 107B;

receiving an event signal 110 triggering a stream swap; and stopping decoding of the first data channel 107A of the initial active stream 108A and initiating decoding the second data channel 107B of the alternate stream 108B for applying it to the utilization device 100 while maintaining the signaling channels 105A and 105B for both the initial active stream 108A and the alternate stream 108B in response to the received event signal 110.

The example utilization device 100 may include a processor 160 that includes a dual or multi core central processing unit CPU, a RAM memory, a ROM memory, and optionally an interface for a keypad, display, and other input/output devices. The processor 160 may include a bidirectional connection 10 to the short-range signaling "A" protocol 116, short-range signaling "B" protocol 114, event handler 120, switch 130, decoder 140A, decoder 140B, and utilization unit 150, for exchanging data, program instructions, and control information.

The RAM and ROM in the processor 160 may be removable memory devices such as smart cards, subscriber identity modules (SIMs), wireless identification modules (WIMs), semiconductor memories such as RAM, ROM, PROMS, flash memory devices, etc, as shown in FIG. 4. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

The following Table I is an example pseudocode representation of an example embodiment of the invention, illustrating how the example source swap function 120 may be implemented as computer program logic that may be stored in the RAM or ROM and executed in the CPU of the processor 160, to enable swapping either the first data stream 107A or the second data stream 107B.

Pseudocode may be viewed as structured English for describing algorithms. It intends to allow the reader to focus on the logic of the algorithm without being distracted by details of language syntax. The objective is to describe the logic of the algorithm so that implementation becomes a rote mechanical task of translating line by line into source code.

Two basic constructs for flow of control are used in the following Table I pseudocode representation:

WHILE is a loop (repetition) with a simple conditional test at its beginning. The WHILE construct is used to specify a loop with a test at the top. The beginning and ending of the loop are indicated by two keywords WHILE and END-WHILE.

IF-THEN-ELSE is a decision (selection) in which a choice is made between two alternative courses of action. Binary choice on a given Boolean condition is indicated by the use of four keywords: IF, THEN, ELSE, and ENDIF.

Sequential control is indicated by writing one action after another, each action on a line by itself, and all actions aligned with the same indent. The actions are performed in the sequence (top to bottom) that they are written.

The following Table I is an example pseudocode representation of an example embodiment of the invention. Line numbering is shown on the left in the Table I, corresponding to the reference numbers shown in the example flow diagram 600 of FIGS. 6A to 6D.

TABLE I

| Example Pseudocode Representation |
| --- |
| 602: WHILE receiving two digital streams 108A and 108B:<br>    604: Separate the first signaling channel 105A from its digital stream 108A and send as "A" signaling 115 to the first short-range signaling "A" protocol 116.<br>    606: Maintain a normal bidirectional signaling session of the first signaling channel 105A with the stream source 102A.<br>    608: Separate the second signaling channel 105B from its digital stream 108B and send as "B" signaling 113 to the second short-range signaling "B" protocol 114.<br>    610: Maintain a normal bidirectional signaling session of the second signaling channel 105B with the second stream source 102B.<br>    612: Separate the first data stream 107A and the second data stream 107B from their respective digital streams 108A and 108B and forward the data streams to the switch 130.<br>    614: Determine the present switched state of switch 130 as either presently passing the first data stream 107A or presently passing the second data stream 107B.<br>    616: IF the present state of switch 130 is passing the first data stream 107A, THEN<br>        618: pass only the first data stream 107A to the decoder 140A, to decode the "A" data 118.<br>        620: Input the decoded "A" data to the utilization unit 150.<br>    622: ELSE<br>        624: pass only the second data stream 107B to the decoder 140B, to decode the "B" data 118'.<br>        626: Input the decoded "B" data to the utilization unit 150.<br>    628: ENDIF<br>    630: Check whether an event signal 110 is received by event handler 120 triggering a selection of either the first data stream 107A or the second data stream 107B.<br>    632: IF the event signal 110 is triggering a selection of the second data stream 107B and the present state of switch 130 is passing the first data stream 107A, THEN<br>        634: Stop decoding the first data stream 107A in the decoder 140A.<br>        636: Initiate decoding the second data stream 107B in the decoder 140B, to decode the "B" data 118'.<br>        638: Input the decoded "B" data to the utilization unit 150.<br>        640: Maintain a normal bidirectional signaling session of the first signaling channel 105A with the stream source 102A.<br>    642: ENDIF<br>    644: IF the event signal 110 is triggering a selection of the first data stream 107A and the present state of switch 130 is passing the second data stream 107B, THEN<br>        646: Stop decoding the second data stream 107B in the decoder 140B.<br>        648: Initiate decoding the first data stream 107A in the decoder 140A, to decode the "A" data 118.<br>        650: Input the decoded "A" data to the utilization unit 150.<br>        652: Maintain a normal bidirectional signaling session of the second signaling channel 105B with the second stream source 102B.<br>    654: ENDIF<br>656: ENDWHILE |

The example flow diagram 600 of the example pseudocode representation of Table I is shown in FIGS. 6A to 6D, illustrating how the example source swap function 120 may be implemented as computer program logic that may be stored in the RAM or ROM and executed in the CPU of the processor 160, to enable swapping either the first data stream 107A or the second data stream 107B.

The overall loop in FIGS. 6A to 6D, starts with the WHILE step 602 and loops back at the ENDWHILE step 656.

In steps 604 to 614, the utilization device 100 receives a first digital stream 108A from a first stream source 102A and a second digital stream 108B from a second stream source 102B, the first digital stream including at least a first signaling channel 105A and a first data channel 107A and the second digital stream including at least a second signaling channel 105B and a second data channel 107B. The utilization device 100 maintains a bidirectional signaling session of the first signaling channel with the first stream source and maintaining a bidirectional signaling session of the second signaling channel with the second stream source.

In steps 616 to 628, the present state of the switch 130 determines whether the first data stream 107A or the second data stream 107B is decoded.

In steps 632 to 642, if the event signal 110 is triggering a selection of the second data stream 107B and the present state of switch 130 is passing the first data stream 107A, then decoding is stopped for the first data stream 107A and decoding is initiated for the second data stream 107B, while a normal bidirectional signaling session is maintained for the first signaling channel 105A. The decoded "B" data is input to the utilization unit 150.

In steps 644 to 654, if the event signal 110 is triggering a selection of the first data stream 107A and the present state of switch 130 is passing the second data stream 107B, then decoding is stopped for the second data stream 107B and decoding is initiated for the first data stream 107A, while a normal bidirectional signaling session is maintained for the second signaling channel 105B. The decoded "A" data is input to the utilization unit 150.

FIG. 1B illustrates an example network diagram of example embodiments for wireless local area network (WLAN) radio digital stream swapping between digital signal sources. A new event handler functionality enables swapping an existing digital stream to a next one if more than one digital stream is identified, enabling a user to easily and intuitively switch between the existing streams, in accordance with at least one embodiment of the present invention. The operational principles of the wireless local area network (WLAN) of FIG. 1B are substantially the same as those described for the operational principles of the short-range radio network of FIG. 1A. An example of the local area network (WLAN) of FIG. 1B is an IEEE 802.11 network.

Similarly to FIG. 1A, FIG. 1B illustrates an example network diagram according to an example embodiment for a utilization device 100, a first stream source 102A, and a second stream source 102B. The first stream source now 102A includes a WLAN radio 104A that transmits a first digital stream 108A having a first signaling channel 105A and a first data stream 107A, which is received by the utilization device 100. The second stream source 102B similarly includes a WLAN radio 104B that transmits a second digital stream 108B having a second signaling channel 105B and a second data stream 107B, which is received by the utilization device 100. The first data stream 107A and second data stream 107B may contain audio content of high-quality in mono or stereo, video content, or audio/video content. The first digital stream 108A and the second digital stream 108B are received by the WLAN transceiver 112' of the utilization device 100. The first data stream 107A and the second data stream 107B may be separated from their respective streams 108A and 108B and respectively forwarded as "A" data 118 or "B" data 118' to the switch 130.

In accordance with one example embodiment of the invention, an event handler 120 in the utilization device 100, includes a source swap function 120 that enables swapping either the first data stream 107A or the second data stream 107B. The swap function 120 controls the switch 130 to either pass the first data stream 107A or the second data stream 107B.

In accordance with another example embodiment of the invention, if the first data stream 107A is selected in response to the event signal 110, then the first data stream 107A will be forwarded as "A" data 118 to the decoder 140A. Alternately, if the second data stream 107B is selected in response to the event signal 110, then the second data stream 107B will be forwarded as "B" data 118 to the decoder 140B.

The first signaling channel 105A may be separated from its digital stream 108A and sent as "A" signaling 115 to the first WLAN signaling "A" protocol 116'. In accordance with an example embodiment of the invention, the first signaling protocol 116' continues a normal bidirectional signaling session with the first WLAN radio 104A in the first stream source 102A, without regard for whether or not the first data stream 107A has been selected by the event signal 110 for input to the utilization unit 150.

The second signaling channel 105B may be separated from its digital stream 108B and sent as "B" signaling 113 to the second WLAN signaling "B" protocol 114'. In accordance with an example embodiment of the invention, the second signaling protocol 114' continues a normal bidirectional signaling session with the second WLAN radio 104B in the second stream source 102B, without regard for whether or not the second data stream 107B has been selected by the event signal 110 for input to the utilization unit 150.

In accordance with an example embodiment of the invention, when the event signal 110 indicates a selection for the first digital stream 108A, the source swap function 120 in the event handler 120, outputs a "Selected A" control signal to the switch 130 that then passes the "A" data 118 to the decoder 140A, to decode the "A" data 118. The decoded "A" data is then input to the utilization unit 150. For example, if the data stream 107A represents audio signals and the utilization unit 150 is an audio output device such as a speaker or headphones, then audio output will be produced when the decoded "A" data 118 from the first data stream 107A is input to the utilization unit 150. During this session when the decoded "A" data 118 from the first data stream 107A is input to the utilization unit 150, the second signaling protocol 114' continues a normal bidirectional signaling over the second signaling channel 105B with the second WLAN radio 104B in the second stream source 102B, even though the second data stream 107B has not been selected by the event signal 110 for input to the utilization unit 150.

Alternately, when the event signal 110 indicates a selection for the second digital stream 108B, the source swap function 120 in the event handler 120, outputs an "Selected B" control signal to the switch 130 that then passes the "B" data 118' to the decoder 140B, to decode the "B" data 118'. The decoded "B" data is then input to the utilization unit 150. For example, if the data stream 107B represents audio signals and the utilization unit 150 is an audio output device such as a speaker or headphones, then audio output will be produced when the decoded "B" data 118' from the second data stream 107B is input to the utilization unit 150. During this session when the decoded "B" data 118' from the second data stream 107B is input to the utilization unit 150, the first signaling protocol 116' continues a normal bidirectional signaling over the first signaling channel 105A with the first WLAN radio 104A in the first stream source 102A, even though the first data stream 107A has not been selected by the event signal 110 for input to the utilization unit 150.

FIG. 1C illustrates an example network diagram of example embodiments for a short-range radio digital stream and a wireless local area network (WLAN) radio digital stream swapping between digital signal sources. A new event handler functionality enables swapping an existing digital stream to a next one if more than one digital stream is identified, enabling a user to easily and intuitively switch between the existing streams, in accordance with at least one embodiment of the present invention. The operational principles of the wireless local area network (WLAN) of FIG. 1C are substantially the same as those described for the operational principles of the short-range radio network of FIGS. 1A and 1B. An example of the short-range radio technology is the Bluetooth™ standard and an example of the local area network (WLAN) of FIG. 1C is an IEEE 802.11 network.

Example network diagram according of FIG. 1C comprises a utilization device 100, a first stream source 102A, and a second stream source 102B. The first stream source 102A includes a short-range radio 103A that transmits a first digital stream 108A including a first signaling channel 105A and a first data stream 107A, which is received by the utilization device 100. The second stream source 102B includes a WLAN radio 104B that transmits a second digital stream 108B including a second signaling channel 105B and a second data stream 107B, which is received by the utilization device 100. In example embodiments of the invention, the first data stream 107A and second data stream 107B may contain audio content of high-quality in mono or stereo, video content, or audio/video content. In an example embodiment of the invention, the first digital stream 108A may be a Bluetooth digital stream and the second digital stream 108B may be IEEE 802.11 WLAN digital streams of audio content.

The first digital stream 108A may be received by a short-range transceiver 112 and the second digital stream 108B may be received by the WLAN transceiver 112' of the utilization device 100. The first data stream 107A and the second data stream 107B may be separated from their respective streams 108A and 108B and respectively forwarded as "A" data 118 or "B" data 118' to the switch 130.

In accordance with one example embodiment of the invention, an event handler 120 in the utilization device 100, includes a source swap function 120 that enables swapping either the first data stream 107A or the second data stream 107B. The swap function 120 controls the switch 130 to either pass the first data stream 107A or the second data stream 107B.

In accordance with another example embodiment of the invention, if the first data stream 107A is selected by the event signal 110, then the first data stream 107A will be forwarded as "A" data 118 to the decoder 140A. Alternately, if the second data stream 107B is selected by the event signal 110, then the second data stream 107B will be forwarded as "B" data 118 to the decoder 140B.

The first signaling channel 105A may be separated from its digital stream 108A and sent as "A" signaling 115 to the first short-range signaling "A" protocol 116. In accordance with an example embodiment of the invention, the first signaling protocol 116 continues a normal bidirectional signaling session with the first short-range radio 103A in the first stream source 102A, without regard for whether or not the first data stream 107A has been selected by the event signal 110 for input to the utilization unit 150.

The second signaling channel 105B may be separated from its digital stream 108B and sent as "B" signaling 113 to the second WLAN signaling "B" protocol 114'. In accordance with an example embodiment of the invention, the second signaling protocol 114' continues a normal bidirectional signaling session with the second WLAN radio 104B in the second stream source 102B, without regard for whether or not the second data stream 107B has been selected by the event signal 110 for input to the utilization unit 150.

In accordance with an example embodiment of the invention, when the event signal 110 indicates a selection for the first digital stream 108A, the source swap function 120 in the event handler 120, outputs a "Selected A" control signal to the switch 130 that then passes the "A" data 118 to the decoder 140A, to decode the "A" data 118. The decoded "A" data is then input to the utilization unit 150. For example, if the data stream 107A represents audio signals and the utilization unit 150 is an audio output device such as a speaker or headphones, then audio output will be produced when the decoded "A" data 118 from the first data stream 107A is input to the utilization unit 150. During this session when the decoded "A" data 118 from the first data stream 107A is input to the utilization unit 150, the second signaling protocol 114' continues a normal bidirectional signaling over the second signaling channel 105B with the second WLAN radio 104B in the second stream source 102B, even though the second data stream 107B has not been selected by the event signal 110 for input to the utilization unit 150.

Alternately, when the event signal 110 indicates a selection for the second digital stream 108B, the source swap function 120 in the event handler 120, outputs an "Selected B" control signal to the switch 130 that then passes the "B" data 118' to the decoder 140B, to decode the "B" data 118'. The decoded "B" data is then input to the utilization unit 150. For example, if the data stream 107B represents audio signals and the utilization unit 150 is an audio output device such as a speaker or headphones, then audio output will be produced when the decoded "B" data 118' from the second data stream 107B is input to the utilization unit 150. During this session when the decoded "B" data 118' from the second data stream 107B is input to the utilization unit 150, the first signaling protocol 116 continues a normal bidirectional signaling over the first signaling channel 105A with the first short-range radio 103A in the first stream source 102A, even though the first data stream 107A has not been selected by the event signal 110 for input to the utilization unit 150.

Figure 2A:
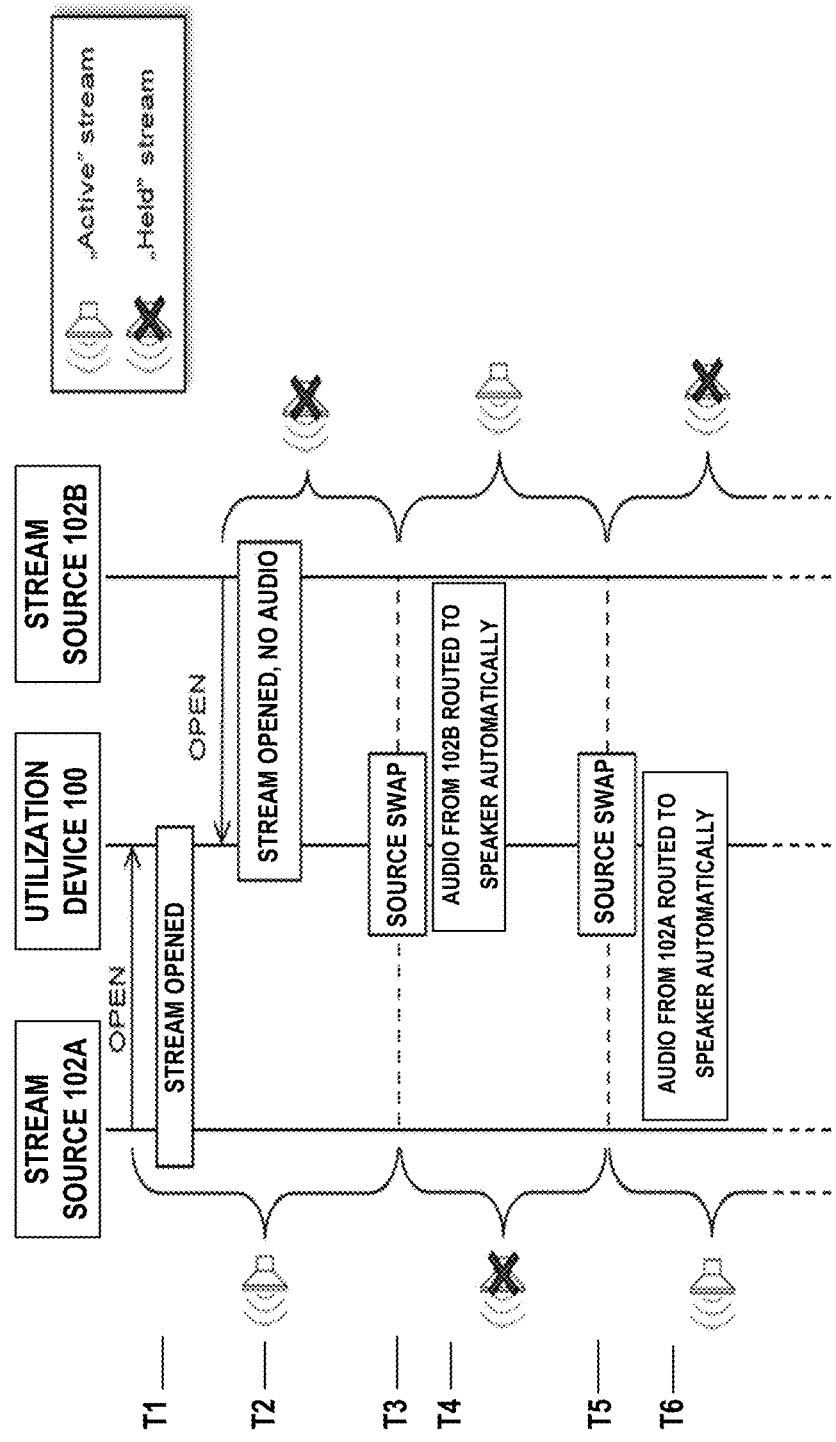
FIG. 2A illustrates an example timing diagram of the example embodiments for digital stream swapping between digital signal sources, in accordance with at least one embodiment of the present invention.

FIG. 2A illustrates an example timing diagram of the example embodiments for digital stream swapping between digital signal sources, in accordance with at least one embodiment of the present invention.

As seen in FIG. 2A, after both sources 102A and 102B have opened the stream channels with the utilization device 100 at times T1 and T2, they remain connected at all times. The process of swapping from source 102A to source 102B at time T3, is completely transparent to the sources, which is done so to avoid the sources 102A and 102B disconnecting from the utilization device 100, if the utilization unit 150, for example, a headset, will reject the audio stream. The example embodiments provide instant swapping with no delays at all, In the Bluetooth interface, each source 102A and 102B believes it is connected exclusively to the utilization device 100, and both source devices keep all signaling messages 105A and 105B as normal. The media channel data 107B (the actual coded music) arriving to the utilization device 100 is routed at time T4, as the "B" data 118' to the utilization unit 150, for example a speaker, if it is the "active" stream, and "A" data 118 is ignored at time T4 if it is the "held" or unselected stream. But, in either case, there is no notification sent to the source 102A or 102B, and there is no partial or complete disconnection from the sources, of any channel, profile, protocol or Bluetooth in general. Therefore, the user does not need to perform any further action when swapping sources 102A and 102B, other than to trigger the Source Swap function 125 in the utilization device 100.

The new event, Source Swap 125, is added to the event handler 120. When the user triggers the event 110, by a button press, voice command, gesture or any other way of interaction between user and accessory, this will cause a check that there is more than one stream open, and then swap to the next stream. If there is only one stream open, then the event 110 is ignored and the user keeps listening to the open audio stream.

When the source swap function is triggered, the utilization device 100 starts ignoring the media channel data 107A or 107B coming from the currently "active" stream, without sending any notification to the source device 102A or 102B, and stops the decoder 140A or 140B used for that data. Then it loads the other needed decoder 140A or 140B for the currently "held" stream, and starts routing the audio to the utilization device 100's speaker, again, without any indication to the source device. Everything is thus done locally in the utilization device 100 and it is completely transparent for the user and the source devices.

Figure 2B:
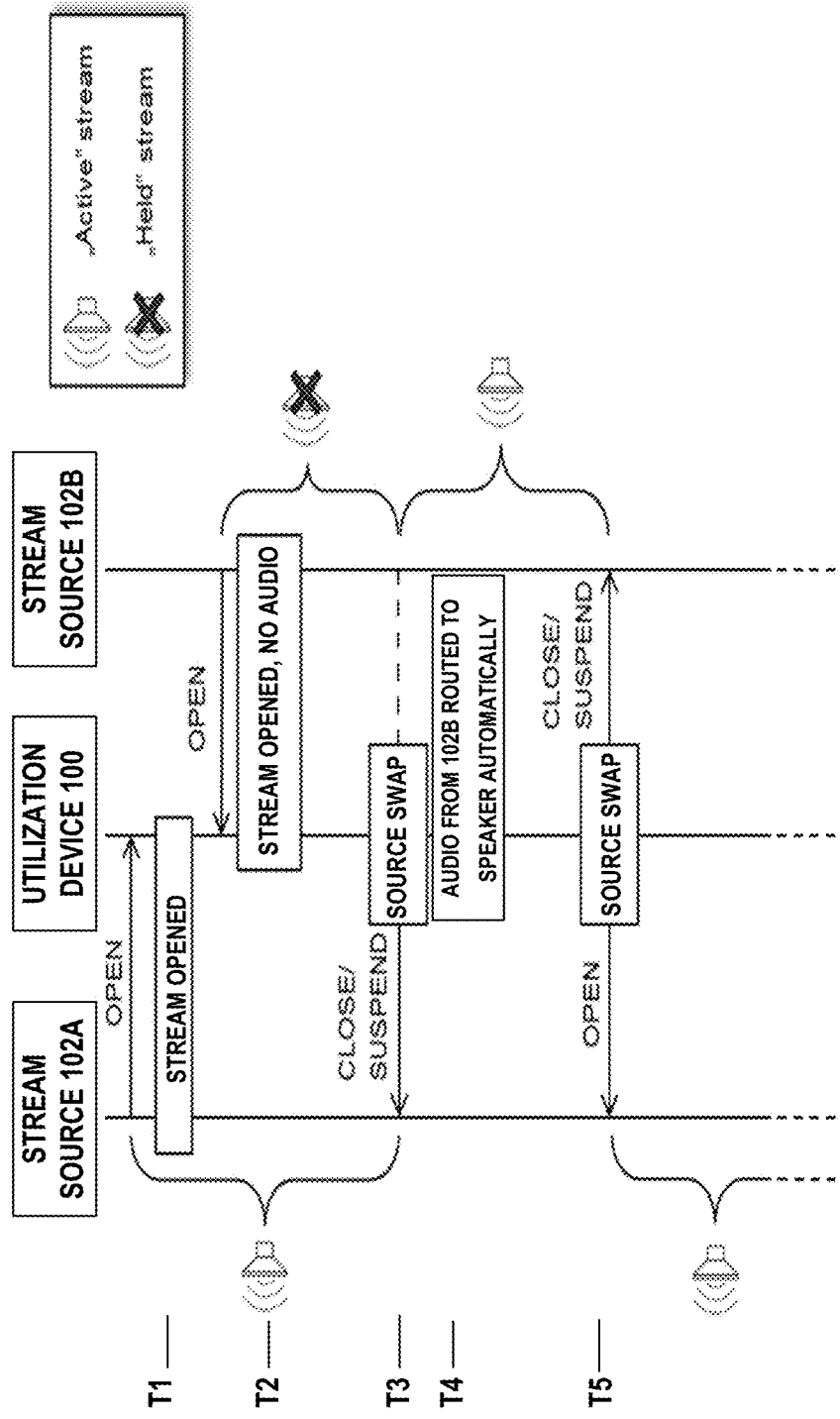
FIG. 2B illustrates an example timing diagram of alternate example embodiments for digital stream swapping between digital signal sources, in accordance with at least one embodiment of the present invention.

FIG. 2B illustrates an example timing diagram of alternate example embodiments for digital stream swapping between digital signal sources, in accordance with at least one embodiment of the present invention.

The principle is the same as for the embodiment of FIG. 2A, but with the difference that when the user triggers the Source Swap function in the utilization device 100 at time T3, this will only keep one active stream at a time, in order to make the swap more obvious for the user, and also to reduce the power consumption of the music source that is not being listened to.

To do this, utilization device 100 needs to check how many streams are open at the time of the Source Swap:

If there is more than one stream, then utilization device 100 may automatically route the audio of the "held" stream to the speaker at time T4, and stop the previous stream, so that it is not left out playing unnecessarily.

If there is only one stream active, then it will stop the current stream at time T5 and at the same time resume the stream from the other connected source.

Figure 3A:
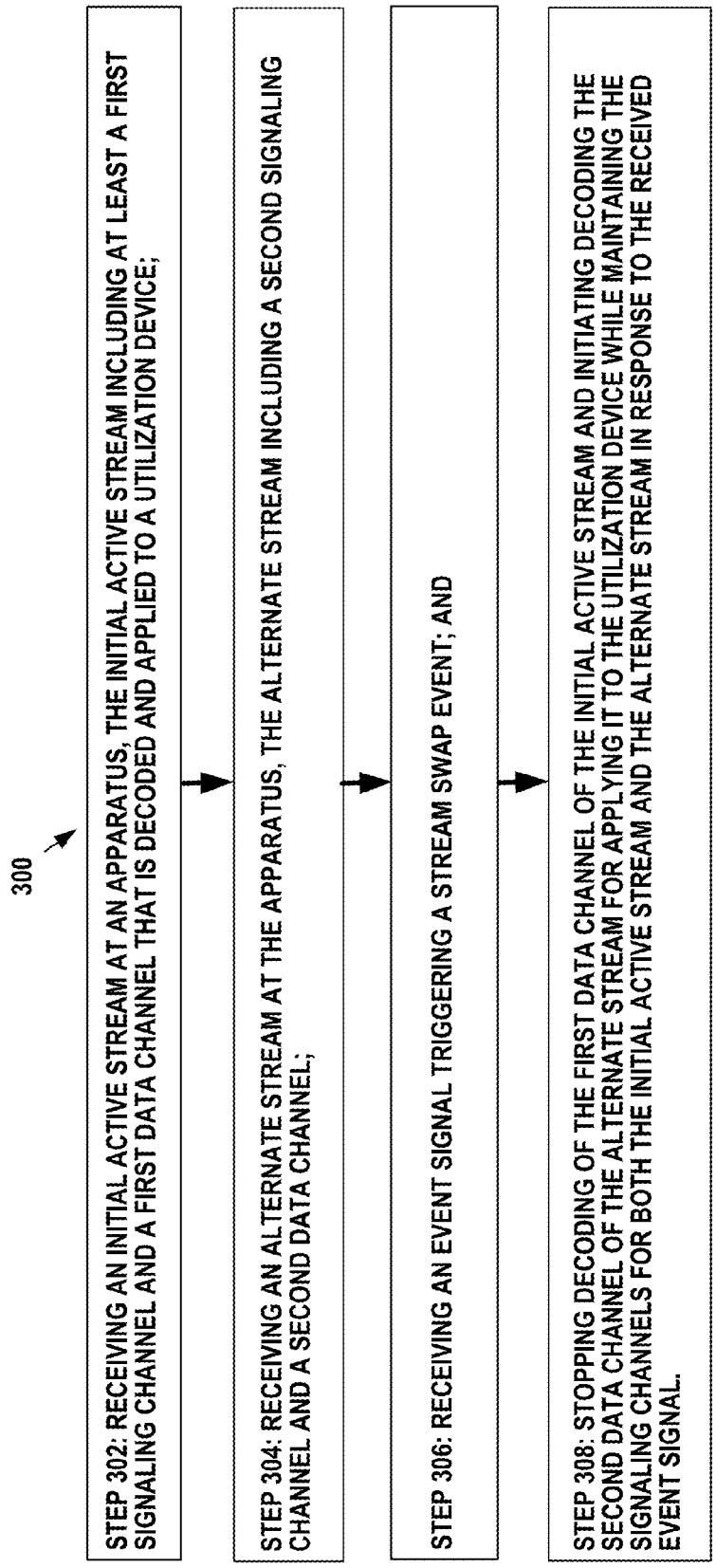
FIG. 3A is an example flow diagram of operational steps in the receiver device of FIGS. 1A, 1B, and 1C, in accordance with at least one embodiment of the present invention.

FIG. 3A is an example flow diagram 300 of operational steps in receiving device of FIGS. 1A, 1B, and 1C, in accordance with at least one embodiment of the present invention. The steps of the flow diagram of FIG. 3A represent computer code instructions stored in the RAM memory of the receiving device, which when executed by the central processing unit (CPU), carry out the functions of a example embodiment of the invention. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. The method includes the steps of:

Step 302: receiving an initial active stream at an apparatus, the initial active stream including at least a first signaling channel and a first data channel that is decoded and applied to a utilization device;

Step 304: receiving an alternate stream at the apparatus, the alternate stream including a second signaling channel and a second data channel;

Step 306: receiving an event signal triggering a stream swap event; and

Step 308: stopping decoding of the first data channel of the initial active stream and initiating decoding the second data channel of the alternate stream for applying it to the utilization device while maintaining the signaling channels for both the initial active stream and the alternate stream in response to the received event signal.

FIG. 3B is an example flow diagram 350 of operational steps in receiving device of FIGS. 1A, 1B, and 1C, and FIGS. 7A, 7B, and 7C, in accordance with at least one embodiment of the present invention. The steps of the flow diagram of FIG. 3B represent computer code instructions stored in the RAM memory of the receiving device, which when executed by the central processing unit (CPU), carry out the functions of a example embodiment of the invention. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. The method includes the steps of:

Step 352: receiving at an apparatus, at least two digital streams, including a first digital stream from a first stream source and a second digital stream from a second stream source, the first digital stream including at least a first signaling channel and a first data channel and the second digital stream including a second signaling channel and a second data channel;

Step 354: maintaining by the apparatus, a bidirectional signaling session for each of the at least two digital streams, including a bidirectional signaling session over the first signaling channel with the first stream source and a bidirectional signaling session over the second signaling channel with the second stream source;

Step 356: decoding by the apparatus the first data channel when the apparatus is in a first state;

Step 358: receiving by the apparatus, an event signal triggering state change for the apparatus; and Step 310: stopping decoding of the first data stream and initiating decoding of the second data stream, if the event signal triggers a second state for the apparatus, while maintaining the signaling channels for each of the at least two digital streams.

FIG. 4 illustrates an example embodiment of the invention, wherein examples of removable storage media 162 are shown, based on magnetic, electronic and/or optical technologies, such as magnetic disks, optical disks, semiconductor memory circuit devices and micro-SD memory cards (SD refers to the Secure Digital standard), for storing data and/or computer program code as an example computer program product, in accordance with at least one embodiment of the present invention. The examples of removable storage media 162 may store computer program logic implementing example embodiments of the invention, as represented for example, by the example pseudocode representation of Table I.

Figure 5A:
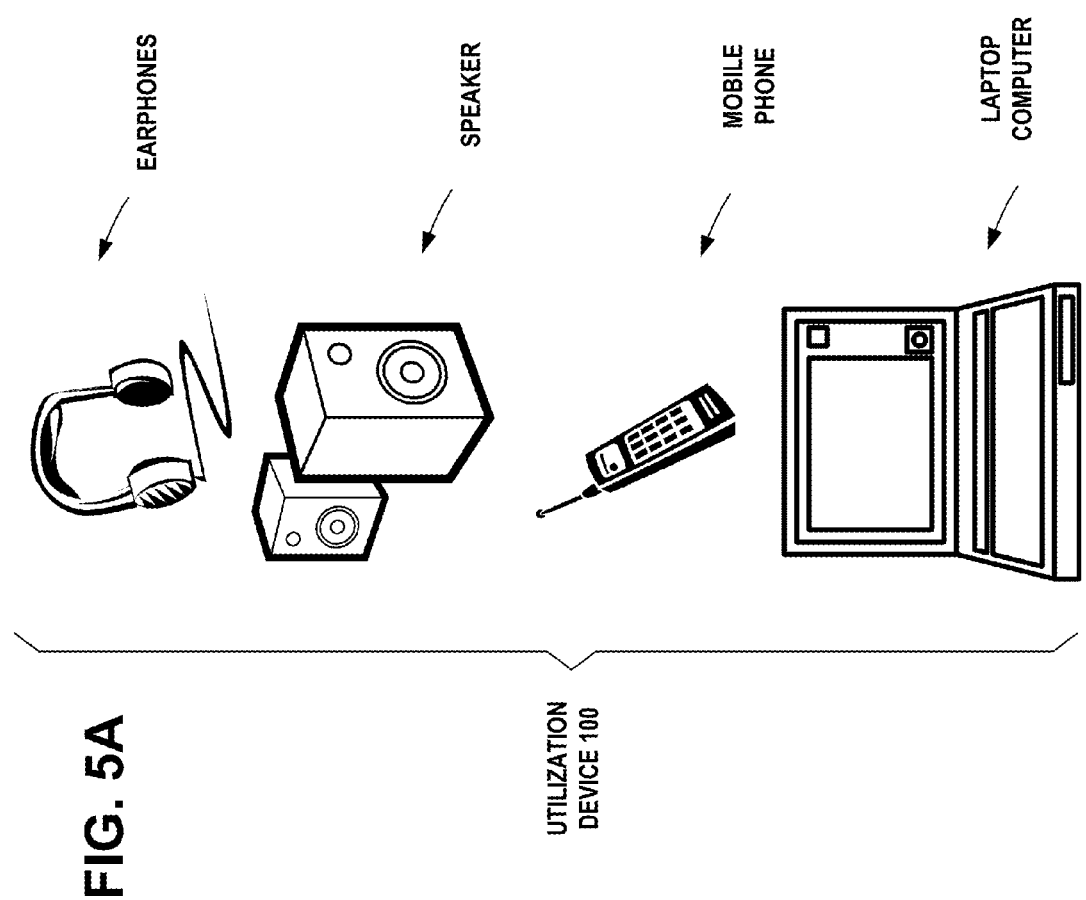
FIG. 5A illustrates an example embodiment of the invention, wherein examples of the utilization device 100 are shown, such as headphones, speaker, mobile phone, or laptop computer, in accordance with at least one embodiment of the present invention.
Figure 5B:
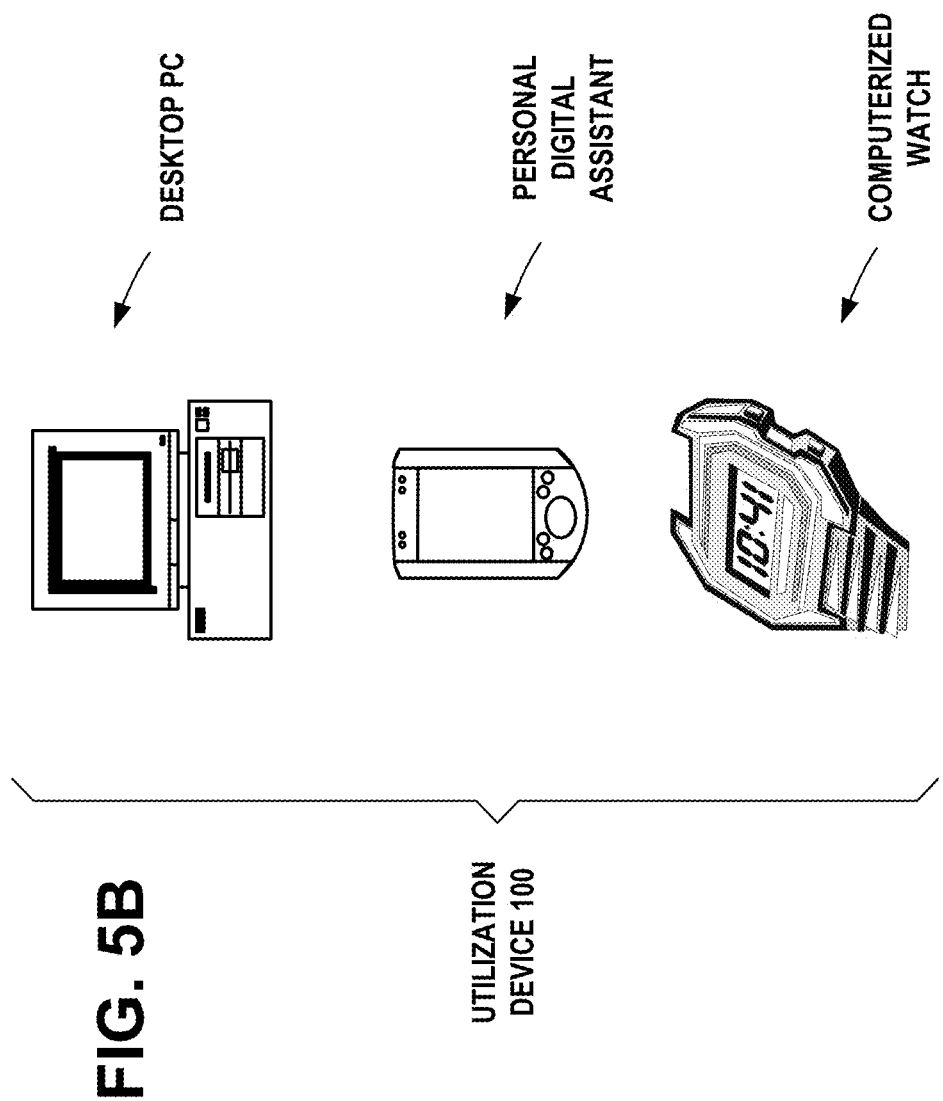
FIG. 5B illustrates an example embodiment of the invention, wherein examples of the utilization device 100 are shown, such as desktop personal computers, personal digital assistants, and computerized watches or jewelry.
Figure 6A:
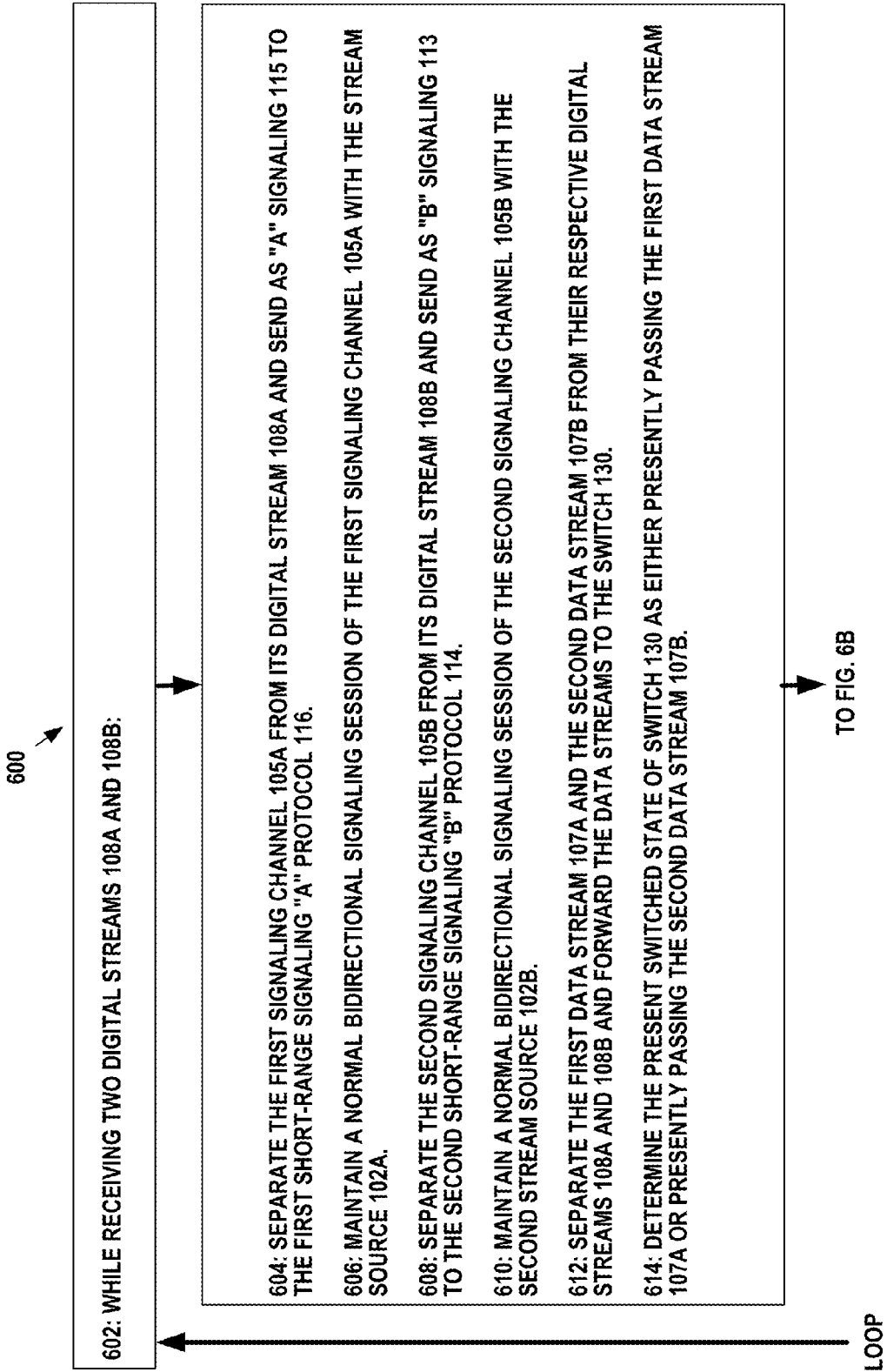

FIG. 5A illustrates an example embodiment of the invention, wherein examples of the utilization device 100 are shown, such as headphones, speaker, mobile phone, or laptop computer, in accordance with at least one embodiment of the present invention. FIG. 5B illustrates an example embodiment of the invention, wherein examples of the utilization device 100 are shown, such as desktop personal computers, personal digital assistants, and computerized watches or jewelry. An example of utilization units 150 that may be contained within the utilization device 100, may be an electrical/acoustic transducer to reproduce sounds for the headphones, speaker, and mobile phone, and a programmed central processor to reproduce sounds, video, or human-readable text for the laptop computer, desktop personal computer, personal digital assistant, and computerized watch or jewelry.

FIGS. 6A to 6D, illustrate an example flow diagram 600 of the example pseudocode representation of Table I, illustrating how the example source swap function may be implemented as computer program logic that may be stored in the RAM or ROM and executed in the CPU of the processor, to enable swapping either the first data stream or the second data stream, in accordance with at least one embodiment of the present invention.

FIG. 7A illustrates an example network diagram of example embodiments for a short-range radio digital stream swapping between a plurality of "N" digital signal sources including a first stream source 102A, a second stream source 102B, through an Nth stream source 102N. In an example embodiment of the invention, the value of the integer "N" may range from three to several hundred or more. The first stream source 102A includes a short-range radio 103A that transmits a first digital stream 108A having a first signaling channel 105A and a first data stream 107A, which is received by the utilization device 100. The second stream source 102B includes a short-range radio 103B that transmits a second digital stream 108B having a second signaling channel 105B and a second data stream 107B, which is received by the utilization device 100. The Nth stream source 102N includes a short-range radio 103N that transmits a Nth digital stream 108N having a Nth signaling channel 105N and a Nth data stream 107N, which is received by the utilization device 100. In an example embodiment of the invention, the first data stream 107A, the second data stream 107B, and the Nth data stream 107N may transmit audio content of high-quality in mono or stereo, video content, or audio/video content. In an example embodiment of the invention, the first digital stream 108A, the second digital stream 108B, and the Nth digital stream 108N may be Bluetooth™ digital streams of audio content transmitted using the Bluetooth™ Advanced Audio Distribution Profile (A2DP). In embodiments of the invention, one or more of the digital streams 108A, 108B, and/or 108C may be a wireless local area network (WLAN) radio digital stream, such as an IEEE 802.11 digital stream.

In accordance with one example embodiment of the invention, the first data stream 107A, the second data stream 107B, and the Nth data stream 107N may transmit a sequence of encoded integers representing information, such as ASCII encoded text. In this example embodiment, the first digital stream 108A, the second digital stream 108B, and the Nth digital stream 108N may be Bluetooth™ digital streams using the Point-to-Point Protocol (PPP) data link protocol commonly used in establishing a direct connection between two networking nodes.

The first digital stream 108A, the second digital stream 108B, and the Nth digital stream 108N are received by the short-range transceiver 112 of the utilization device 100. The first data stream 107A, the second data stream 107B, and the Nth data stream 107N may be separated from their respective streams 108A, 108B, and 108N and respectively forwarded as "A" data, "B" data, or "C" data to the switch 130'.

In accordance with one example embodiment of the invention, an event handler 120' in the utilization device 100, includes a source swap function 120' that enables swapping any of the first data stream 107A, the second data stream 107B, or the Nth data stream 107N with any of the other data streams. The swap function 120' controls the switch 130' to pass a selected one of first data stream 107A, the second data stream 107B, or the Nth data stream 107N.

In accordance with another example embodiment of the invention, if the first data stream 107A is selected by the event signal 110, then the first data stream 107A will be forwarded as "A" data to the decoder 140A. Alternately, if the second data stream 107B is selected by the event signal 110, then the second data stream 107B will be forwarded as "B" data to the decoder 140B. Alternately, if the Nth data stream 107N is selected by the event signal 110, then the Nth data stream 107N will be forwarded as "N" data to the decoder 140N.

The first signaling channel 105A is separated from its digital stream 108A and sent as "A" signaling 115 to the first short-range signaling "A" protocol 116. In accordance with an example embodiment of the invention, the first signaling protocol 116 continues a normal bidirectional signaling session with the first short-range radio 103A in the first stream source 102A, without regard for whether or not the first data stream 107A has been selected by the event signal 110 for input to the utilization unit 150.

The second signaling channel 105B is separated from its digital stream 108B and sent as "B" signaling 113 to the second short-range signaling "B" protocol 114. In accordance with an example embodiment of the invention, the second signaling protocol 114 continues a normal bidirectional signaling session with the second short-range radio 103B in the second stream source 102B, without regard for whether or not the second data stream 107B has been selected by the event signal 110 for input to the utilization unit 150.

The Nth signaling channel 105N is separated from its digital stream 108N and sent as "N" signaling 113N to the Nth short-range signaling "N" protocol 114N. In accordance with an example embodiment of the invention, the Nth signaling protocol 114N continues a normal bidirectional signaling session with the Nth short-range radio 103N in the Nth stream source 102N, without regard for whether or not the Nth data stream 107N has been selected by the event signal 110 for input to the utilization unit 150.

In accordance with an example embodiment of the invention, when the event signal 110 triggers a selection for the first digital stream 108A, the source swap function 125' in the event handler 120, outputs a "Selected A" control signal to the switch 130' that then passes the "A" data to the decoder 140A, to decode the "A" data. The decoded "A" data is then input to the utilization unit 150. During this session when the decoded "A" data from the first data stream 107A is input to the utilization unit 150, the second signaling protocol 114 continues a normal bidirectional signaling over the second signaling channel 105B with the second short-range radio 103B in the second stream source 102B and the Nth signaling protocol 114N continues a normal bidirectional signaling over the Nth signaling channel 105N with the Nth short-range radio 103N in the Nth stream source 102N, even though the second data stream 107B and the Nth data stream 107N have not been selected by the event signal 110 for input to the utilization unit 150.

Alternately, and in accordance with another example embodiment of the invention, when the event signal 110 triggers a selection for the Nth digital stream 108N, the source swap function 125' in the event handler 120', outputs a "Selected N" control signal to the switch 130' that then passes the "N" data to the decoder 140N, to decode the "N" data. The decoded "N" data is then input to the utilization unit 150. During this session when the decoded "N" data from the Nth data stream 107N is input to the utilization unit 150, the first signaling protocol 116 continues a normal bidirectional signaling over the first signaling channel 105A with the first short-range radio 103A in the first stream source 102A and the second signaling protocol 114B continues a normal bidirectional signaling over the second signaling channel 105B with the second short-range radio 103B in the second stream source 102B, even though the first data stream 107A and the second data stream 107B have not been selected by the event signal 110 for input to the utilization unit 150.

In accordance with an embodiment of the invention, the utilization device 100 receives at least two digital streams 108A and 108N, including a first digital stream 108A from a first stream source 102A and another digital stream 108N from another stream source 102N, the first digital stream including at least a first signaling channel 105A and a first data channel 107A and the another digital stream 102N including another signaling channel 105N and another data channel 107N.

The utilization device 100 maintains a bidirectional signaling session for each of the at least two digital streams, including a bidirectional signaling session of the first signaling channel 105A with the first stream source 102A and maintaining a bidirectional signaling session of the another signaling channel 105N with the another stream source 102N.

The utilization device 100 decodes the first data channel 107A if the switch 130' is in a first state passing the first data channel 107A or decodes the another data channel 107N if the switch 130' is in another state passing the Nth data channel 107N.

The utilization device 100 receives an event signal 110 at the event handler 120' triggering a selection of the another data stream 107N.

The utilization device 100 stops decoding the first data stream 107A and initiates decoding the another data stream 107N, if the event signal 110 triggers a selection of the another data stream 107N and the switch 130' is in the first state, while maintaining the signaling channels 105A and 105N for each of the at least two digital streams 108A and 108N, in response to the received event signal 110.

The following Table II is an example pseudocode representation of an example embodiment of the invention, illustrating how the example source swap function 120' of FIG. 7A may be implemented as computer program logic that may be stored in the RAM or ROM and executed in the CPU of the processor 160, to enable swapping between a plurality of "N" digital signal sources, including a first stream source 102A, a second stream source 102B, through an Nth stream source 102N.

A third construct for flow of control used in the following Table II pseudocode representation is CASE. CASE is a multiway branch (decision) based on the value of an expression. CASE is a generalization of IF-THEN-ELSE. A CASE construct indicates a multiway branch based on conditions that are mutually exclusive. Four keywords, CASE, OF, OTHERS, and ENDCASE, and conditions are used to indicate the various alternatives.

The following Table II is an example pseudocode representation of an example embodiment of the invention shown in FIG. 7A.

TABLE II

Example Pseudocode Representation

WHILE receiving "N" digital streams 108A, 108B, through 108N:
    Separate the first signaling channel 105A from its digital stream 108A and send as "A" signaling 115 to the first short-range signaling "A" protocol 116.
    Maintain a normal bidirectional signaling session of the first signaling channel 105A with the stream source 102A.
    Separate the second signaling channel 105B from its digital stream 108B and send as "B" signaling 113 to the second short-range signaling "B" protocol 114.
    Maintain a normal bidirectional signaling session of the second signaling channel 105B with the second stream source 102B.
    Separate the Nth signaling channel 105N from its digital stream 108N and send as "N" signaling 113N to the Nth short-range signaling "N" protocol 114N.
    Maintain a normal bidirectional signaling session of the Nth signaling channel 105N with the Nth stream source 102N.
    Separate the first data stream 107A, the second data stream 107B, and the Nth data stream 107N from their respective digital streams 108A, 108B, and 108N and forward the data streams to the switch 130'.
    Determine the present switched state of switch 130' as presently passing the first data stream 107A, presently passing the second data stream 107B, or presently passing the Nth data stream 107N.
    CASE Data stream being passed by switch 130' OF
        First data stream:
            pass only the first data stream 107A to the decoder 140A, to decode the "A" data.
            Input the decoded "A" data to the utilization unit 150.
        Second data stream:
            pass only the second data stream 107B to the decoder 140B, to decode the "B" data.
            Input the decoded "B" data to the utilization unit 150.
        ...
        Nth data stream:
            pass only the Nth data stream 107N to the decoder 140N, to decode the "N" data.
            Input the decoded "N" data to the utilization unit 150.
    ENDCASE
    Check whether an event signal 110 is received by event handler 120' triggering a selection of either the first data stream 107A, the second data stream 107B, or the Nth data stream 107N.
    IF the event signal 110 is triggering a selection of the Nth data stream 107N and the present state of switch 130' is passing either the first data stream 107A or the second data stream 107B, THEN
        Stop decoding the first data stream 107A or the second data stream 107B, whichever one is presently being passed.
        Initiate decoding the Nth data stream 107N in the decoder 140N, to decode the "N" data.
        Input the decoded "N" data to the utilization unit 150.
        Maintain a normal bidirectional signaling session of the first signaling channel 105A with the stream source 102A and the second signaling channel 105B with the stream source 102B.

TABLE II-continued

Example Pseudocode Representation

```
    ENDIF
    IF the event signal 110 is triggering a selection of the second data stream 107B and the
    present state of switch 130' is passing either the first data stream 107A or the Nth data
    stream 107N, THEN
            Stop decoding the first data stream 107A or the Nth data stream 107N, whichever
            one is presently being passed.
            Initiate decoding the second data stream 107B in the decoder 140B, to decode the
            "B" data 118'.
            Input the decoded "B" data to the utilization unit 150.
            Maintain a normal bidirectional signaling session of the first signaling channel
            105A with the stream source 102A and the Nth signaling channel 105N with the
            stream source 102N.
    ENDIF
    IF the event signal 110 is triggering a selection of the first data stream 107A and the
    present state of switch 130' is passing either the second data stream 107B or the Nth data
    stream 107N, THEN
            Stop decoding the second data stream 107B or the Nth data stream 107N,
            whichever one is presently being passed..
            Initiate decoding the first data stream 107A in the decoder 140A, to decode the
            "A" data 118.
            Input the decoded "A" data to the utilization unit 150.
            Maintain a normal bidirectional signaling session of the second signaling channel
            105B with the second stream source 102B and the Nth signaling channel 105N
            with the stream source 102N.
    ENDIF
ENDWHILE
```

Figure 7B:
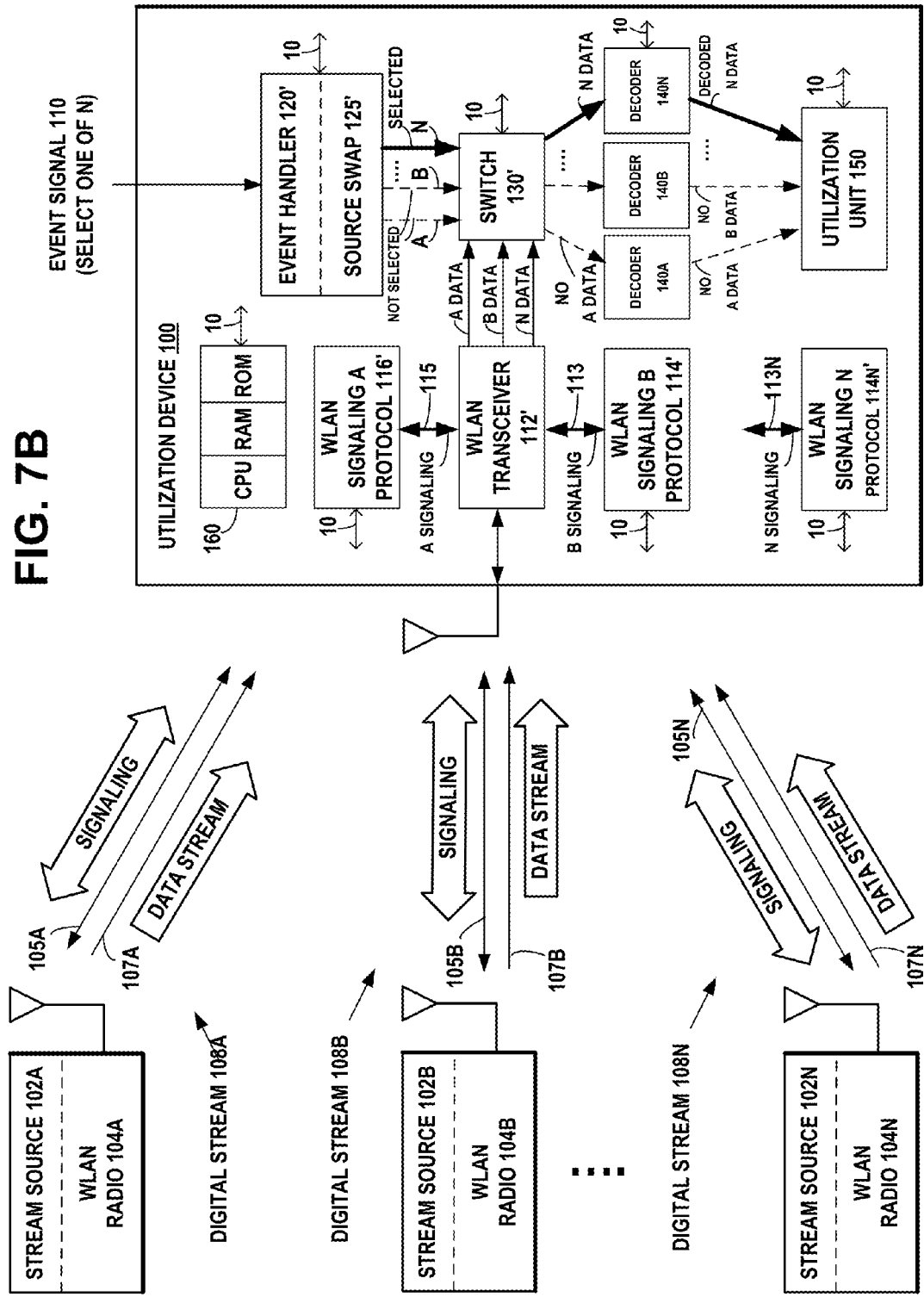
FIG. 7B illustrates an example network diagram of example embodiments for a wireless local area network (WLAN) radio digital stream swapping between a plurality of "N" digital signal sources, in accordance with at least one embodiment of the present invention.

FIG. 7B illustrates an example network diagram of example embodiments for a wireless local area network (WLAN) radio digital stream swapping between a plurality of "N" digital signal sources, in accordance with at least one embodiment of the present invention. The operational principles of the wireless local area network (WLAN) of FIG. 7B are substantially the same as those described for the operational principles of the short-range radio network of FIG. 7A and the local area network (WLAN) of FIG. 1B. An example of the local area network (WLAN) of FIG. 7B is an IEEE 802.11 network.

FIG. 7C illustrates an example network diagram of example embodiments for a short-range radio digital stream and wireless local area network (WLAN) radio digital streams swapping between a plurality of "N" digital signal sources, in accordance with at least one embodiment of the present invention. The operational principles of the wireless local area network (WLAN) of FIG. 1C are substantially the same as those described for the operational principles of the short-range radio network of FIG. 7A and the local area network (WLAN) of FIG. 1B and FIG. 7B. An example of the short-range radio technology is the Bluetooth™ standard and an example of the local area network (WLAN) of FIG. 1C is an IEEE 802.11 network.

Using the description provided herein, the embodiments may be implemented as a machine, process, or article of manufacture by using standard programming and/or engineering techniques to produce programming software, firmware, hardware or any combination thereof.

Some or all of the steps in the flow diagrams disclosed herein may be embodied as hardware program logic included in programmed logic arrays of sequential and/or combinatorial logic circuits and/or state machine logic implementing some or all of the steps performed by embodiments of the invention.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer readable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method comprising:
   receiving an initial active stream at an apparatus over a short-range radio link, the initial active stream including at least a first bidirectional signaling channel and a first data channel that is decoded and applied to an associated utilization device, wherein the active stream contains media content that is decoded and applied to the associated utilization device for media playback;
   receiving an alternate stream at the apparatus over a short-range radio link, the alternate stream including a second bidirectional signaling channel and a second data channel, wherein the alternate stream contains media content that is decoded and applied to the associated utilization device for media playback;
   receiving an event signal triggering a stream swap from the initial stream to the alternate stream; and
   stopping decoding of the first data channel of the initial active stream and initiating decoding of the second data channel of the alternate stream for applying it to the associated utilization device while maintaining the bidirectional signaling channels for both the initial active stream and the alternate stream in response to the received event signal, wherein the bidirectional signaling channels specify transaction procedures between the apparatus and first and second stream sources;

wherein the apparatus continues signaling sessions with both stream sources irrespective of whether the first or the second data channel has been selected for input on the associated utilization device.

2. The method of claim 1, further comprising:
wherein the event signal is received in response to a user action comprising at least one of a button press, a voice command, or a gesture.

3. The method of claim 1, further comprising:
receiving a second event signal triggering a second stream swap;
stopping the decoding of the data channel but maintaining the bidirectional signaling channel of the alternate stream in response to the second event signal; and
resuming decoding of the data channel of the active stream and applying it to the associated utilization device.

4. An apparatus comprising:
at least one processor;
at least one memory including computer program code;
the at least one memory and the computer program code are configured to, with the at least one processor, cause the apparatus at least to:
receive an initial active stream over a short-range radio link, the initial active stream including at least a first bidirectional signaling channel and a first data channel that is decoded and applied to an associated utilization device, wherein the active stream contains media content that is decoded and applied to the associated utilization device for media playback;
receive an alternate stream over a short-range radio link, the alternate stream including a second bidirectional signaling channel and a second data channel, wherein the alternate stream contains media content that is decoded and applied to the associated utilization device for media playback;
receive an event signal triggering a stream swap from the initial stream to the alternate stream; and
stop decoding of the first data channel of the initial active stream and initiate decoding of the second data channel of the alternate stream to apply it to the associated utilization device and maintain the bidirectional signaling channels for both the initial active stream and the alternate stream in response to the received event signal, wherein the bidirectional signaling channels specify transaction procedures between the apparatus and first and second stream sources;
wherein the apparatus continues signaling sessions with both stream sources irrespective of whether the first or the second data channel has been selected for input on the associated utilization device.

5. The apparatus of claim 4, wherein the event signal is received in response to a user action comprising at least one of a button press, a voice command, or a gesture.

6. The apparatus of claim 4, wherein the associated utilization device comprises at least one of an audio playing device, a video playing device, or an audio/video playing device.

7. The apparatus of claim 4, wherein the at least one memory and the computer program are code configured to, with the at least one processor, further cause the apparatus at least to:

receive a second event signal triggering a second stream swap;
stop the decoding of the data channel but maintain the bidirectional signaling channel of the alternate stream in response to the second event signal; and
resume decoding the data channel of the active stream and apply it to the associated utilization device.

8. The apparatus of claim 4, wherein the active stream and the alternate stream comprise at least one of a Bluetooth digital stream or a wireless LAN digital stream.

9. A computer program product comprising computer executable program code recorded on a computer readable non-transitory storage medium, the computer executable program code, when executed by a computer processor, causing performance of the steps of:
receiving an initial active stream at an apparatus over a short-range radio link, the initial active stream including at least a first bidirectional signaling channel and a first data channel that is decoded and applied to an associated utilization device, wherein the active stream contains media content that is decoded and applied to the associated utilization device for media playback;
receiving an alternate stream at the apparatus over a short-range radio link, the alternate stream including a second bidirectional signaling channel and a second data channel, wherein the alternate stream contains media content that is decoded and applied to the associated utilization device for media playback;
receiving an event signal triggering a stream swap from the initial stream to the alternate stream; and
stopping decoding of the first data channel of the initial active stream and initiating decoding of the second data channel of the alternate stream for applying it to the associated utilization device while maintaining the bidirectional signaling channels for both the initial active stream and the alternate stream in response to the received event signal, wherein the bidirectional signaling channels specify transaction procedures between the apparatus and first and second stream sources;
wherein the apparatus continues signaling sessions with both stream sources irrespective of whether the first or the second data channel has been selected for input on the associated utilization device.

10. The computer program product of claim 9, wherein the computer executable program code, when executed by a computer processor, further causing performance of the steps of:
receiving a second event signal triggering a second stream swap;
stopping the decoding of the data channel but maintaining the bidirectional signaling channel of the alternate stream in response to the second event signal; and
resuming decoding of the data channel of the active stream and applying it to the associated utilization device.

11. A method comprising:
receiving at an apparatus, at least two digital streams over short-range radio links, including a first digital stream from a first stream source and a second digital stream from a second stream source, the first digital stream including at least a first bidirectional signaling channel and a first data channel and the second digital stream including a second bidirectional signaling channel and a second data channel, wherein the first and second streams contain media content that is decoded and applied to an associated utilization device for media playback;

maintaining by the apparatus, a bidirectional signaling session for each of the at least two digital streams, including a bidirectional signaling session over the first bidirectional signaling channel with the first stream source and a bidirectional signaling session over the second bidirectional signaling channel with the second stream source, wherein the bidirectional signaling sessions specify transaction procedures between the apparatus and the first and second stream sources;

decoding by the apparatus the first data channel when the apparatus is in a first state;

receiving by the apparatus, an event signal triggering state change for the apparatus; and stopping decoding of the first data stream and initiating decoding of the second data stream, if the event signal triggers a second state for the apparatus, while maintaining the bidirectional signaling channels for each of the at least two digital streams;

wherein the apparatus continues signaling sessions with both stream sources irrespective of whether the first or the second data channel has been selected.

12. The method of claim 11, further comprising:
receiving at the apparatus, a third digital stream from a third stream source, the third digital stream including at least a third bidirectional signaling channel and a third data channel, maintaining by the apparatus, a bidirectional signaling session over the third bidirectional signaling channel with the third stream source;

receiving by the apparatus, an event signal triggering a selection of the third data stream; and stopping decoding of the first data stream and initiating decoding of the third data stream, when the event signal triggers a selection of the third data stream and the apparatus is in the first state, or alternately stopping decoding of the second data stream and initiating decoding of the third data stream, when the event signal triggers a selection of the third data stream and the apparatus is in the second state, while maintaining the bidirectional signaling channels for each of the at least two digital streams in response to the received event signal.

13. The method of claim 11, further comprising:
applying the decoded first data channel to an associated utilization device when the apparatus is in the first state or applying the decoded second data channel to the associated utilization device when the apparatus is in the second state.

14. An apparatus comprising:
at least one processor;
at least one memory including computer program code;
the at least one memory and the computer program code configured to, with the at least one processor, cause the apparatus at least to:
receive at least two digital streams over short-range radio links, including a first digital stream from a first stream source and a second digital stream from a second stream source, the first digital stream including at least a first bidirectional signaling channel and a first data channel and the second digital stream including a second bidirectional signaling channel and a second data channel, wherein the first and second streams contain media content that is decoded and applied to an associated utilization device for media playback;

maintain a bidirectional signaling session for each of the at least two digital streams, including a bidirectional signaling session over the first bidirectional signaling channel with the first stream source and a bidirectional signaling session over the second bidirectional signaling channel with the second stream source, wherein the bidirectional signaling sessions specify transaction procedures between the apparatus and the first and second stream sources;

decode the first data channel when the apparatus is in a first state;

receive an event signal triggering state change for the apparatus; and stop decoding of the first data stream and initiate decoding of the second data stream, if the event signal triggers a second state for the apparatus, and maintain the bidirectional signaling channels for each of the at least two digital streams;

wherein the apparatus continues signaling sessions with both stream sources irrespective of whether the first or the second data channel has been selected.

15. The apparatus of claim 14, further comprising:
the at least one memory and the computer program code configured to, with the at least one processor, cause the apparatus at least to:

receive a third digital stream from a third stream source, the third digital stream including at least a third bidirectional signaling channel and a third data channel, maintain a bidirectional signaling session over the third bidirectional signaling channel with the third stream source;

receive an event signal triggering a selection of the third data stream; and stop decoding of the first data stream and initiate decoding of the third data stream, when the event signal triggers a selection of the third data stream and the apparatus is in the first state, or alternately stop decoding of the second data stream and initiate decoding of the third data stream, when the event signal triggers a selection of the third data stream and the apparatus is in the second state, and maintaining the bidirectional signaling channels for each of the at least two digital streams in response to the received event signal.

16. The apparatus of claim 14, further comprising:
the at least one memory and the computer program code configured to, with the at least one processor, cause the apparatus at least to:
apply the decoded first data channel to an associated utilization device when the apparatus is in the first state or apply the decoded second data channel to the associated utilization device when the apparatus is in the second state.

17. A computer program product comprising computer executable program code recorded on a computer readable non-transitory storage medium, the computer executable program code, when executed by a computer processor, causing performance of the steps of:
receiving at an apparatus, at least two digital streams over short-range radio links, including a first digital stream from a first stream source and a second digital stream from a second stream source, the first digital stream including at least a first bidirectional signaling channel and a first data channel and the second digital stream including a second bidirectional signaling channel and a second data channel, wherein the first and second streams contain media content that is decoded and applied to an associated utilization device for media playback;

maintaining by the apparatus, a bidirectional signaling session for each of the at least two digital streams, including a bidirectional signaling session over the first bidirectional signaling channel with the first stream source and a bidirectional signaling session over the second bidirectional signaling channel with the second stream source, wherein the bidirectional signaling sessions specify transaction procedures between the apparatus and the first and second stream sources;

decoding by the apparatus the first data channel when the apparatus is in a first state;

receiving by the apparatus, an event signal triggering state change for the apparatus; and stopping decoding of the first data stream and initiating decoding of the second data stream, if the event signal triggers a second state for the apparatus, while maintaining the bidirectional signaling channels for each of the at least two digital streams;

wherein the apparatus continues signaling sessions with both stream sources irrespective of whether the first or the second data channel has been selected.

18. The computer program product of claim 17, further comprising computer executable program code recorded on a computer readable non-transitory storage medium, the computer executable program code, when executed by a computer processor, causing performance of the steps of:

receiving at the apparatus, a third digital stream from a third stream source, the third digital stream including at least a third bidirectional signaling channel and a third data channel, maintaining by the apparatus, a bidirectional signaling session over the third bidirectional signaling channel with the third stream source;

receiving by the apparatus, an event signal triggering a selection of the third data stream; and stopping decoding of the first data stream and initiating decoding of the third data stream, when the event signal triggers a selection of the third data stream and the apparatus is in the first state, or alternately stopping decoding the second data stream and initiating decoding the third data stream, when the event signal triggers a selection of the third data stream and the apparatus is in the second state, while maintaining the bidirectional signaling channels for each of the at least two digital streams in response to the received event signal.

19. The computer program product of claim 17, further comprising computer executable program code recorded on a computer readable non-transitory storage medium, the computer executable program code, when executed by a computer processor, causing performance of the step of:

applying the decoded first data channel to an associated utilization device when the apparatus is in the first state or applying the decoded second data channel to the associated utilization device when the apparatus is in the second state.

20. The method of claim 1, wherein the short-range radio link is a Bluetooth or WLAN radio link.

* * * * *